US012269386B2

(12) United States Patent
Cho et al.

(10) Patent No.: US 12,269,386 B2
(45) Date of Patent: Apr. 8, 2025

(54) SERVICE PROVIDING APPARATUS PROVIDING IN-VEHICLE SERVICE AND CONTROL METHOD OF THE APPARATUS

(71) Applicant: LG ELECTRONICS INC., Seoul (KR)

(72) Inventors: Sungil Cho, Seoul (KR); Jaehoon Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/717,965

(22) PCT Filed: Jan. 25, 2023

(86) PCT No.: PCT/KR2023/001109
§ 371 (c)(1),
(2) Date: Jun. 7, 2024

(87) PCT Pub. No.: WO2024/158061
PCT Pub. Date: Aug. 2, 2024

(65) Prior Publication Data
US 2024/0416817 A1     Dec. 19, 2024

(51) Int. Cl.
*B60N 3/18*     (2006.01)
*B60R 7/04*     (2006.01)
(Continued)

(52) U.S. Cl.
CPC .............. *B60N 3/18* (2013.01); *B60R 7/04* (2013.01); *B60R 11/04* (2013.01); *B65G 47/90* (2013.01);
(Continued)

(58) Field of Classification Search
CPC ........... B60N 3/10; B60R 11/02; B60R 16/03; B60R 11/00; B60R 11/04; B60R 7/04;
(Continued)

(56) References Cited

U.S. PATENT DOCUMENTS

| 10,575,155 | B1* | 2/2020 | Bai | H04W 4/50 |
| 2017/0032783 | A1* | 2/2017 | Lord | G06F 3/167 |
| 2022/0382504 | A1* | 12/2022 | Cioarga | G06F 3/147 |

FOREIGN PATENT DOCUMENTS

| CN | 110544351 A * 12/2019 | G07F 17/00 |
| DE | 102020103764 A1 * 10/2020 | H04L 63/10 |

(Continued)

OTHER PUBLICATIONS

PCT International Application No. PCT/KR2023/001109, Written Opinion of the International Searching Authority dated Oct. 13, 2023, 3 pages.

*Primary Examiner* — James R Bidwell
(74) *Attorney, Agent, or Firm* — LEE, HONG, DEGERMAN, KANG & WAIMEY

(57) ABSTRACT

The present disclosure relates to an in-vehicle service providing apparatus, the apparatus including a module unit including service modules configured to provide services, a rail part including a rail stretched into a cabin of a vehicle, a moving part onto which one of the service modules is seated and fixed, and which is configured to move along the rail; and a processor configured to: identify a request for a service that may be provided through one of the service modules, detect a first service module corresponding to the identified service request, and determine a service providing position and control the module unit to seat the first service module onto the moving part, and control the moving part onto which the first service module is seated to move to the determined service providing position.

20 Claims, 15 Drawing Sheets

(51) Int. Cl.
*B60R 11/04* (2006.01)
*B65G 47/90* (2006.01)
*G06Q 30/06* (2023.01)
*G06V 20/59* (2022.01)
*G07F 13/10* (2006.01)

(52) U.S. Cl.
CPC .......... *G06V 20/59* (2022.01); *B60N 2210/24* (2023.08); *B60N 2230/20* (2023.08); *G06Q 30/06* (2013.01); *G07F 13/10* (2013.01)

(58) Field of Classification Search
CPC ........ B60W 40/08; B65G 47/90; F25B 21/02; G06Q 30/06; G06Q 50/12; G07F 13/10; G10L 15/28; G06V 20/59
See application file for complete search history.

(56) References Cited

FOREIGN PATENT DOCUMENTS

| | | | |
|---|---|---|---|
| JP | 2004354930 | 12/2004 | |
| KR | 1020160135872 | 11/2016 | |
| KR | 102352138 | 1/2022 | |
| KR | 1020220052228 | 4/2022 | |
| KR | 1020220085420 | 6/2022 | |
| WO | WO-2018230738 A1 * | 12/2018 | ........... B60R 16/037 |

\* cited by examiner (a)

(b)

(a)

(b)

(a)

(b)

(a)

(b)

(c)

SERVICE PROVIDING APPARATUS PROVIDING IN-VEHICLE SERVICE AND CONTROL METHOD OF THE APPARATUS

CROSS-REFERENCE TO RELATED APPLICATION(S)

This application is the National Stage filing under 35 U.S.C. 371 of International Application No. PCT/KR2023/001109, filed on Jan. 25, 2023, the contents of which are all incorporated by reference herein in its entirety.

TECHNICAL FIELD

The present disclosure relates to a service providing apparatus configured to provide various services such as provision of a beverage in a vehicle.

BACKGROUND ART

At present, as vehicle-related technologies are advanced, an interest in a service that may be provided using a vehicle is rising. Particularly, with the advent of electric vehicles using electrical energy as power unlike existing internal combustion engine vehicles, a structure of vehicles has become simple, and accordingly, a large space in a vehicle may be ensured. Thus, there is an increasing social need for variously utilizing a space inside a vehicle.

Further, with advances in technologies related to autonomous operation of vehicles such as autonomous driving, as leisure time in which passengers may enjoy in a vehicle are increasing, this need is gradually increasing.

As part of such in-vehicle services, a method of providing food and beverages such as soft drinks or light alcoholic beverages in a vehicle has emerged. As part of this method, a vehicle in which a beverage dispenser filled with the beverage is disposed in one space inside the vehicle has appeared. Thus, passengers in the vehicle may be provided with a service of beverages dispensed from the beverage dispenser.

However, when a beverage dispenser is placed in one space inside the vehicle, there is a problem in that a passenger who is to get a beverage service needs to move to a position in which the beverage dispenser is placed, receive a beverage dispensed from the beverage dispenser, and then, move back to the passenger's seat. In this case, this would not be a serious problem when a space inside the vehicle is small, and thus, the passenger may be provided with the beverage service without having to get up from the passenger's seat. However, in a case of high-occupancy vehicles such as limousines or buses, a space inside a vehicle is very large, and accordingly, there is a problem in that a person who wants to get a beverage service needs to move to a position in which a beverage dispenser is placed.

However, when a vehicle moves, vibration and inertia due to the movement of the vehicle may be exerted. Therefore, getting up from a seat and moving around inside a vehicle may be very dangerous. In addition, even after the passenger moves to the beverage dispenser and gets a beverage dispensed into a container, there may be a problem such that the beverage may be spilt or the passenger may get injured due to the inertia and the vibration caused by the movement of the vehicle.

Accordingly, research is being actively conducted on a method of safely and conveniently providing various services such as beverages to passengers in a vehicle.

DISCLOSURE OF INVENTION

Technical Problem

Therefore, to obviate those problems, an aspect of the detailed description is to provide an in-vehicle service providing apparatus capable of providing various services such as beverages to a passenger in a vehicle while the passenger is sitting in the passenger's seat, and a method of controlling the in-vehicle service providing apparatus.

Solution to Problem

To achieve these and other advantages and in accordance with the purpose of the present disclosure, as embodied and broadly described herein, there is provided an in-vehicle service providing apparatus including: a module unit including a plurality of service modules configured to provide services different from each other; a rail part including a rail stretched into a cabin of a vehicle; a moving part onto which one of the plurality of service modules is seated and fixed, and which is configured to move along the rail; and a processor configured to: identify a request for a service that may be provided through one of the plurality of service modules, detect a first service module corresponding to the identified service request, and determine a service providing position based on a position of a service requester who made the identified service request in the cabin; and control the module unit to seat the first service module onto the moving part, and control the moving part onto which the first service module is seated to move to the determined service providing position.

According to one embodiment, the module unit may include: a first frame stretched in a direction intersecting the rail and located at a certain height from the rail; a second frame disposed below the first frame, stretched in a direction parallel to a direction of the first frame, and connected to different service modules at a constant interval along the direction of being stretched; and a frame moving part connected to the second frame and configured to move the connected second frame along the first frame, wherein the processor moves the second frame by controlling the frame moving part to align the first service module with a base position in which the first frame intersects the rail.

According to one embodiment, the second frame and each of the plurality of service modules may be connected through tension portions corresponding to the plurality of service modules, respectively, the tension portions may be configured to be stretchable in a downward direction, and include a tension head coupled to a service module corresponding to the tension head and configured to fix the coupled service module, and when the first service module is aligned with the base position according to the movement of the second frame, the processor may control a tension portion corresponding to the first service module to stretch the tension head to seat the first service module on the moving part disposed in the base position.

According to one embodiment, the service module may include: a service module body; a first coupling portion disposed at an upper end of the service module body, and configured to be coupled and fixed to the tension head; and a second coupling portion disposed at a lower end of the service module body, and configured to be coupled and fixed to the moving part.

According to one embodiment, the tension head and at least one part of an upper end of the moving part may include an electromagnet configured to generate magnetic force when power is supplied, and the first coupling portion and the second coupling portion of the service module may be made of a metallic material adsorbed onto the electromagnet due to attractive force generated by magnetic force when the magnetic force is generated from the electromagnet.

According to one embodiment, the processor may supply power to one of a first electromagnet disposed in the tension head of the tension portion corresponding to the first service module and a second electromagnet disposed at the upper end of the moving part, and change an electromagnet to which the power is supplied based on whether the first service module is seated on the moving part, and whether the service module seated on the moving part has returned to the base position.

According to one embodiment, the processor may extract a voice feature from the identified service request, identifies the service requester from the extracted voice feature, estimate a seat position or a seated position of the identified service requester from a pre-stored seat map or a cabin image obtained by sensing passengers in the cabin, and determine one position located on the rail to be adjacent to the estimated seat position or seated position as the service providing position.

According to one embodiment, the processor may detect face feature information corresponding to the identified service requester from pre-stored face feature information of different people and detect a passenger corresponding to the detected face feature information from the cabin image to estimate the seated position of the service requester.

According to one embodiment, the in-vehicle service providing apparatus may further include an interface unit configured to receive the cabin image obtained from at least one camera disposed in the vehicle, wherein the processor obtains the cabin image by controlling the interface unit.

According to one embodiment, the in-vehicle service providing apparatus may further include an interface unit connected to a control unit of the vehicle or a communication unit configured to perform a communication connection to a preset external server, wherein the processor transmits voice information corresponding to the identified service request to the control unit of the vehicle or the external server, and, in response to the transmitting, receives information about an estimated seat position or seated position of an identified service requester.

According to one embodiment, the vehicle or the external server may be configured to: include a voice information database in which voice feature information for each of a plurality of people related to the vehicle is stored, and a face information database in which face feature information for each of the plurality of people related to the vehicle, and identify, when the voice information corresponding to the identified service request is received from the processor, a service requester corresponding to a voice feature of the voice information based on the voice information database, detect face feature information corresponding to the identified service requester based on the face information database, detect a seated position of a particular passenger corresponding to the detected face feature information among passengers in the cabin included in the cabin image obtained by sensing the passengers in the cabin, and transmit information about the detected seated position of the particular passenger, in response to the voice information.

According to one embodiment, the in-vehicle service providing apparatus may further include a maintenance module configured to provide cold air or hot air to a lower portion of the base position, wherein the processor detects a service module that needs heating or cooling among the plurality of service modules and heats or cools the detected service module by moving the detected service module to the base position.

According to one embodiment, the processor may place the moving part in the base position, control the module unit to seat the service module that needs heating or cooling on the moving part located in the base position, and drive the maintenance module when the service module is seated on the moving part to transfer cold air or hot air discharged from the maintenance module to the seated service module via the moving part.

According to one embodiment, the moving part may include at least one conductor or through hole configured to transfer the cold air or the hot air discharged from the maintenance module to the service module seated on the moving part.

According to one embodiment, the plurality of service modules may be modules filled with beverages different from each other to serve beverages different from each other, and the in-vehicle service providing apparatus may further include a communication unit configured to perform a communication connection with at least one external server configured to provide maintenance information in correspondence with the different beverages filled in the plurality of service modules, respectively.

According to one embodiment, the processor may move the plurality of service modules sequentially to the base position to heat or cool the plurality of service modules according to the maintenance information in correspondence with the different beverages, the maintenance information being provided from the at least one external server.

According to one embodiment, the moving part may include a plurality of rail moving parts disposed to be movable along the rail and configured such that the one of the plurality of service modules is seated thereon, and in a state when the first service module is seated on the first rail moving part and moved along the rail to provide a service according to an identified first service request, when a second service request corresponding to a second service module is identified, the processor may control the module unit so that the second service module is seated on a second rail moving part, and control the second rail moving part to be moved to a service position of a service requester corresponding to the second service request.

According to one embodiment, in a state when the first service module is seated on the first rail moving part and moved along the rail to provide the service according to the identified first service request, when the second service request corresponding to the second service module and a third service request corresponding to a third service module are identified, the processor may control the module unit and the moving part so that service modules corresponding to respective service requests are seated on different rail moving parts and move along the rail sequentially, according to a result of comparing a transport distance according to a position of the service requester corresponding to the second service request to a transport distance according to a position of a service requester corresponding to the third service request.

According to one embodiment, the moving part may be configured to have a gantry structure including left and right support portions connected to both left and right sides of the rail part, respectively.

According to one embodiment, the rail part may include a conveyor belt configured to move along the rail, and a space having a certain size may be defined between an upper surface of the rail part configured as the conveyor belt and an upper inner end of the moving part having the gantry structure connecting between the left side support portion and the right side support portion.

Advantageous Effects of Invention

Effects of an in-vehicle service providing apparatus according to the present disclosure and a method of controlling the in-vehicle service providing apparatus are described as follows.

According to at least one of the embodiments of the present disclosure, configuration may be such that a plurality of service modules capable of providing different services are included, and a rail which allows at least one of the service modules to be moved to different positions inside a vehicle is included. In addition, a passenger in the vehicle may be provided with various services such as a beverage while sitting in a seat of the passenger by moving a service module according to a requested service to different positions in the rail according to a seat position of a requester of the requested service in the vehicle. Accordingly, there is an effect of safely and conveniently providing various services such as the beverage to passengers in the vehicle.

MODE FOR THE INVENTION

It should be noted that the technical terms used in this specification are only used to describe specific embodiments and are not intended to limit the present disclosure. A singular representation used herein may include a plural representation unless it represents a definitely different meaning from the context. In general, a suffix such as "module" and "unit" may be used to refer to elements or components. Use of such a suffix herein is merely intended to facilitate description of the specification, and the suffix itself is not intended to give any special meaning or function.

In this application, the terms "comprising" and "including" should not be construed to necessarily include all of the elements or steps disclosed herein, and should be construed not to include some of the elements or steps thereof, or should be construed to further include additional elements or steps.

In describing the present disclosure, if a detailed explanation for a related known function or construction is considered to unnecessarily divert the gist of the present disclosure, such explanation has been omitted but would be understood by those skilled in the art.

The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings. It should also be understood that each of embodiments described below and combinations of those embodiments are all changes, equivalents, or substitutes which can belong to the idea and scope of the present disclosure.

Figure 1:
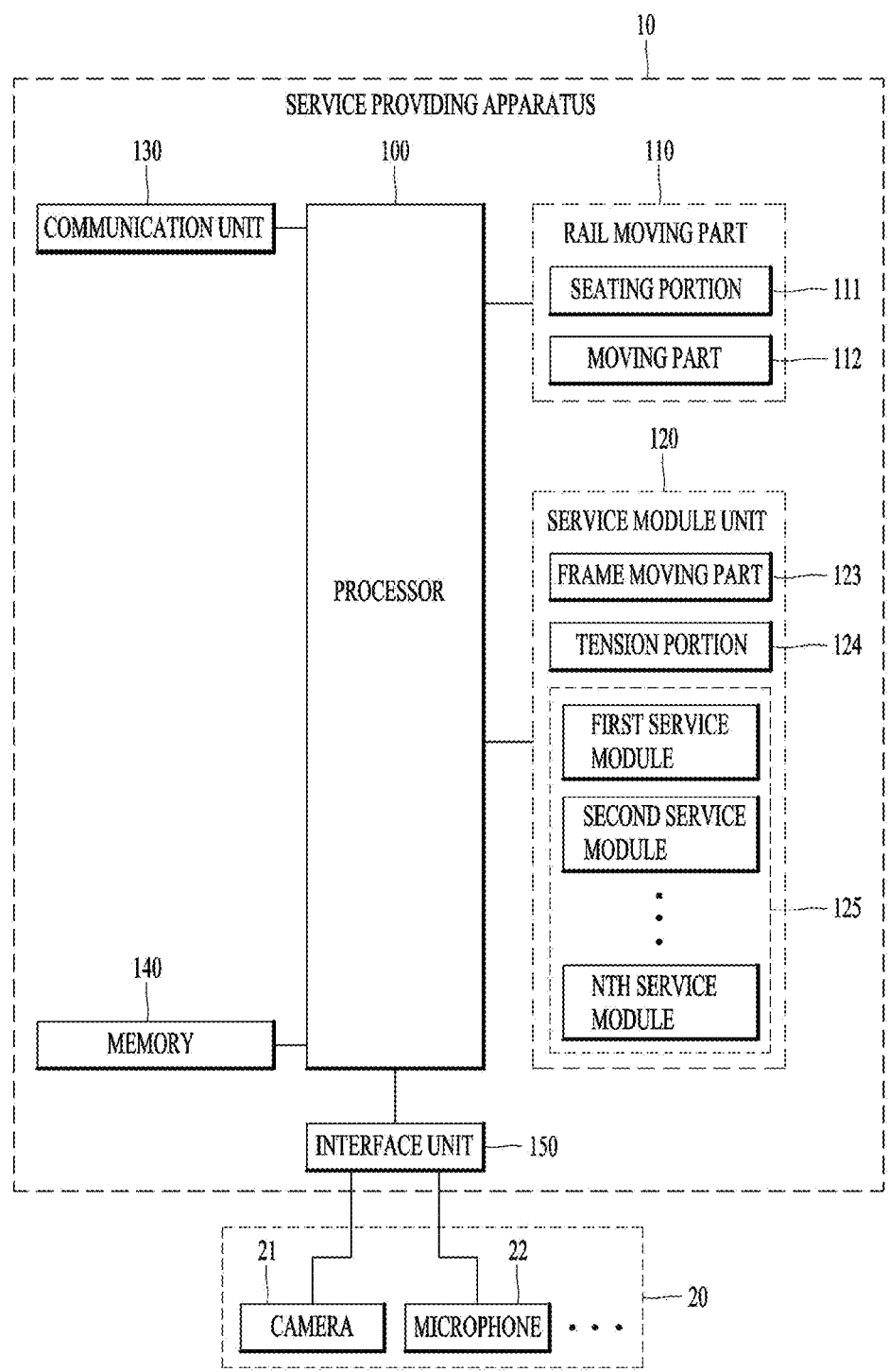
FIG. 1 is a block diagram illustrating a structure of a service providing apparatus according to an embodiment of the present disclosure.
Figure 2:
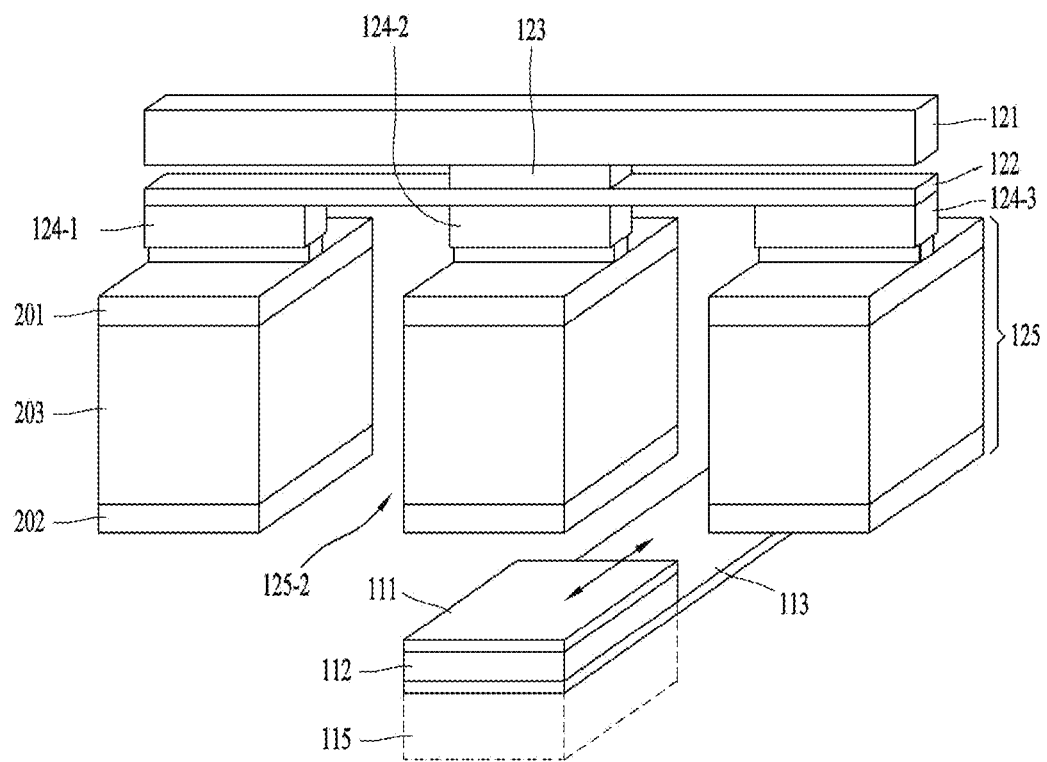
FIG. 2 illustrates an example of configuring the service providing apparatus of FIG. 1.

FIG. 1 is a block diagram illustrating a structure of a service providing apparatus 10 according to an embodiment of the present disclosure. FIG. 2 illustrates an example of a configuration of the service providing apparatus 10 of FIG. 1.

Referring to FIG. 1, the service providing apparatus 10 according to an embodiment of the present disclosure may include a processor 100, a rail moving part 110 connected to the processor 100, a service module unit 120, and a communication unit 130, a memory 140, and an interface unit 150. The components illustrated in FIG. 1 are not essential for implementing the service providing apparatus 10, and the service providing apparatus 10 described herein may have more or fewer components than those described above.

The service providing apparatus 10 according to an embodiment of the present disclosure may include a rail part 113 configured to be stretched into a cabin in which passengers are on board in a vehicle 20. In addition, a rail moving part 110 configured to be movable along a direction in which the rail part 113 is stretched may be included. The rail moving part 110 may include a moving part 112 coupled to a rail disposed on at least one side surface of the rail part 113. Additionally, a seating portion 111 coupled to the moving part 112 may be included.

The moving part 112 may include at least one wheel or gear configured to move a body of the moving part 112 along the rail. Additionally, at least one drive motor configured to move the body of the moving part 112 by providing driving force to the at least one wheel or gear may be included.

The seating portion 111 onto which a body of a service module configured to provide a service may be seated and fixed may be disposed on an upper surface of the body of the moving part 112. The seating portion 111 may be a component separate from the moving part 112. In this case, the seating portion 111 may be disposed to have a form of being coupled to the moving part 112. Accordingly, when the moving part 112 moves along the rail, the seating portion 111 combined or integrally disposed with the moving part 112 may move together.

The seating portion 111 may include at least one coupling mechanism configured to fix the body of the service module. For example, the at least one coupling mechanism may perform coupling by electromagnetic force. In this case, a coupling portion (a second coupling portion 202) made of a metal material may be disposed at a lower end of the service module. The metal material may be a metal material generating attractive force by magnetism, and may be metal adsorbed onto a magnet by magnetic force. Additionally, the seating portion 111 may include an electromagnet which generates magnetic force, that is, electromagnetic force when power is supplied. Therefore, when the service module is seated on the seating portion 111, as the second coupling portion 202 is adsorbed onto the seating portion 111 due to the electromagnetic force generated from the electromagnet disposed on the seating portion 111, the body of the service module may be fixed to the seating portion 111.

As such, since the service module is fixed onto the seating portion 111, when the moving part 112 coupled to the seating portion 111 moves along the rail, the service module adsorbed and fixed onto the seating portion 111 may be also moved along the rail.

Meanwhile, as described above, the seating portion 111 and the moving part 112 may be integrated with each other. In this case, a wheel, a gear and a drive motor each configured to move the body along the rail part 113 may be disposed at a bottom of the seating portion 111 and the moving part 112 integrated with each other, that is, the rail moving part 110. On a top of the rail moving part 110 on which the service module is seated, the electromagnet for fixing the service module seated on the top may be placed inside or outside.

Meanwhile, the service module unit may include a first frame 121 disposed in a direction intersecting a direction in which the rail part 113 is stretched. Additionally, a frame moving part 112 disposed to be movable in a direction in which the first frame 121 is stretched along the first frame 121 may be included. As an example, the first frame 121 may have a rail disposed on one side surface, and the frame moving part 112 may include a wheel, a gear, or the like disposed to be movable along the rail on the one side surface of the first frame 121. Additionally, at least one drive motor configured to control driving force may be included such that the wheel or the gear may move a body of the frame moving part 112 along an inner rail of the first frame 121.

Meanwhile, the frame moving part 112 may be connected to a second frame 122 stretched in the direction in which the first frame 121 is stretched. Alternatively, the frame moving part 112 may be integrally disposed with the second frame 122. In this case, the body of the frame moving part 112 may be the second frame 122. Additionally, a service module 125 may be connected to the second frame 122 at a constant interval in the direction in which the second frame 122 is stretched. Accordingly, a plurality of service modules 125 may be connected to the second frame 122 as shown in FIG. 2.

Accordingly, when the frame moving part 112 moves along the first frame 121, the second frame 122 may be moved along with the movement of the frame moving part 112. Then, the plurality of service modules 125 connected to the second frame 122 may be moved along the first frame 121. Accordingly, when the first frame 121 is disposed in the direction intersecting the direction in which the rail part 113 is stretched, one of the plurality of service modules 125 may be located in mid-air over the seating portion 111 on the rail part 113. As such, when one service module is placed on the seating portion 111, the one service module may be located at an alignment position corresponding to the seating portion 111. For example, as illustrated in FIG. 2, when a second service module 125-2 is placed on the seating portion 111 according to the movement of the second frame 122, the second service module 125-2 may be disposed in a position corresponding to the seating portion 111, that is, in the alignment position. Hereinafter, mid-air over the seating portion 111, that is, a mid-air location corresponding to the seating portion 111 is referred to as an alignment position.

As illustrated in FIG. 2, the plurality of service modules 125 may be connected to different positions in the second frame 122. Accordingly, when the second frame 122 moves according to the movement of the frame moving part 112, different service modules 125 may be moved to the alignment position.

Additionally, a tension portion 124 may be disposed between each of the service modules 125 and the second frame 122, respectively. In this case, as illustrated in FIG. 2, each of the service modules 125 may be connected to the second frame 122 in a form hanging through the tension portion 124 corresponding to each of the service modules 125.

Here, each of the service modules 125 may be connected to the second frame 122 to be placed in a position apart from the seating portion 111 on the rail part 113 by a certain height. Therefore, as illustrated in FIG. 2, each of the service modules 125 may be located in mid-air at a certain height from a position in which the seating portion 111 is disposed.

Additionally, the tension portion 124 may be configured to be stretched in a vertical direction. For example, the tension portion 124 may include a drive motor such as a linear motor, etc., and a tension head may be stretched according to driving of the drive motor. Here, when the tension head is stretched, the tension head may be stretched in a downward direction, that is, in a direction in which the seating portion 111 is located. In addition, the tension head may be coupled to a service module 125. Accordingly, when the tension head is stretched, a service module coupled to the tension head may be lowered, and when the service module is in the alignment position, the service module may be seated on the seating portion 111.

Additionally, a state of the tension head that has been stretched may be restored (hereinafter referred to as contracted) by driving the drive motor. Then, as the tension head is contracted, the service module coupled to the tension head may be raised, and when the service module is in the alignment position, the service module seated on the seating portion 111 may be spaced apart from the seating portion 111.

Meanwhile, the tension portion 124, more particularly, the tension head may include at least one coupling mechanism for be coupled to a service module. As an example, the service module may include a coupling portion (a first coupling portion 201) disposed at an upper end and made of a metal material that generates attraction by magnetism. In addition, the tension head of the tension portion 124 may include an electromagnet generating electromagnetic force when power is supplied. Accordingly, when the supply of the power is maintained, the tension head of the tension portion 124 may be maintained in a state of being coupled to the first coupling portion 201 of the service module 125 by adsorption due to magnetism. On the other hand, when the power supply to the tension head of the tension portion 124 is cut off, the coupling between the service module 125 and the tension head may be released due to loss of the magnetism. Accordingly, the tension head may be separated from the service module 125.

Meanwhile, as described above, a plurality of service modules 125 capable of providing different services may be connected to the second frame 122. As an example, the different services may be services for providing different types of beverages. As an example, three service modules filled with wine, water, and coffee, respectively, may be connected to the second frame 122. In addition, each of the service modules 125 may include a dispense portion configured to dispense a beverage filled therein, and a dispense lever configured to control the dispense portion or a container detection unit (not shown) configured to automatically dispense an appropriate amount of beverage when a container is detected.

With respect to the interface unit 150, the interface unit 150 may be connected to an interface unit (not shown, hereinafter referred to as a vehicle interface unit) of the vehicle 20, and may receive various information provided by the vehicle 20 through the vehicle interface unit. Here, the vehicle interface unit may function as a passage for various types of external devices connected to the vehicle 20 or respective components of the vehicle 10. For example, the vehicle interface unit may have various ports connected to the interface unit 150, and may be connected to the interface unit 150 through the ports. In addition, the vehicle interface unit may exchange data with the interface unit 150.

The interface unit 150 may be connected to respective components of the vehicle 20 through the vehicle interface unit. As an example, the interface unit 150 may be connected to at least one camera 21 of the vehicle 20 and receive an image of inside of the cabin sensed by the at least one camera 21. The image of the inside of the cabin sensed by the camera 21 may be used to identify a service requester who requested a service inside the cabin.

The interface unit 150 may be connected to a microphone 22 of the vehicle 20 through the vehicle interface unit. Additionally, a request for a service associated with one of the plurality of service modules 125 may be received through the microphone 22. In this case, when a request (a voice request) for a service associated with a particular service module is received by the microphone 22, the service request may be transmitted to the processor 100 through the interface unit 150.

Meanwhile, the processor 100 may control respective components connected thereto and control all operations of the service providing apparatus 10. As an example, when a request for a service is detected through the interface unit 150, the processor 100 may identify a requester who requested the service. For example, the processor 100 may identify a service requester based on voice recognition information stored in the memory 140. Then, among face feature information of different passengers stored in the memory 140, face feature information of a person corresponding to the identified service requester may be detected. Then, based on an image of passengers in the cabin, a position of a passenger in the cabin corresponding to the detected face feature information may be detected. In addition, a service providing position may be determined based on the detected position of the passenger in the cabin. Here, the service providing position may be any position on the rail part 113 stretched into the cabin.

Then, the processor 100 may detect a service module according to the service request. Additionally, the frame moving part 112 may be controlled so that the detected service module is moved to an alignment position corresponding to a position of the seating portion 111. Then, when the second frame 122 moves according to the movement of the frame moving part 112, and thus, the detected service module is moved to the alignment position on the seating portion 111, a tension portion 124 corresponding to the detected service module may be controlled to stretch a tension head. Then, as the tension head is stretched, the service module 125 connected to the tension head may be seated on the seating portion 111.

When the service module 125 is seated on the seating portion 111, the processor 100 may control the seating portion 111 to fix the second coupling portion 202 of the service module 125. In addition, the tension portion 124 may be controlled to release the tension head and the first coupling portion 201 of the service module 125. Then, the service module 125 may be fixed onto the seating portion 111 by coupling the second coupling portion 202 to the seating portion 111, and separated from the tension portion 124.

Then, the processor 100 may control the moving part 112 to move the moving part 112 to the determined service providing position. Accordingly, the seating portion 111 coupled to the moving part 112 and the service module 125 fixed onto the seating portion 111 may be moved to the service providing position on the rail part 113. Then, when provision of the service such as dispensing of a beverage to the service requester is completed, the processor 100 may move the moving part to an initial position, that is, a base position. Then, the tension portion 124 corresponding to the detected service module may be controlled to stretch the tension head, and when the tension head is stretched to be brought into contact with the first coupling portion 201 of the service module 125, power may be supplied to the tension head to couple the tensile head to the first coupling portion 201 according to adsorption by magnetism.

Additionally, the processor 100 may release a fixed state of the service module 125 by controlling the seating portion 111 when the tension head is coupled to the first coupling portion 201. As described above, when the seating portion 111 fixes the service module 125 with electromagnetic force using an electromagnet, the processor 100 may cut off power supplied to the electromagnet of the seating portion 111 to release the fixed state of the service module 125. Then, the seating portion 111 may be separated from the second coupling portion 202 of the service module 125.

In a state in which the tension head of the tension portion 124 is coupled to the first coupling portion 201 of the service module 125, when the seating portion 111 is separated from the second coupling portion 202 of the service module 125, the processor 100 may control the tension portion 124 to contract the tension head. Therefore, like the initial state shown in FIG. 2, the service module 125 may be separated from the seating portion 111 and moved to mid-air over the seating portion 111, i.e., the alignment position. Then, the processor 100 may control the frame moving part 112 to move the second frame 122 to an initial position on the first frame.

Meanwhile, the memory 140 may store data supporting various functions of the service providing apparatus 10 according to an embodiment of the present disclosure. The memory 140 may store a plurality of application programs (application programs or applications) that may be executed by the processor 100, and data and instructions for driving the rail moving part 110 and the service module unit 120.

As an example, the memory 140 may store information about voice features of respective passengers in the cabin. Additionally, the memory 140 may store information about face features of the respective passengers in the cabin. Accordingly, the processor 100 may identify a particular passenger corresponding to a service request received from the microphone 22 based on the information about the voice features stored in the memory 140, and detect a position of the identified particular passenger in the cabin based on an image of inside of the cabin sensed by the camera 21.

Additionally, the service providing apparatus 10 may further include a communication unit 130 capable of performing wireless communication with a preset external server. Here, the preset external server may be a cloud server, and may be a server configured to provide maintenance information for each of different service modules included in the service providing apparatus 10. In this case, when a particular service module is included in the service module unit 120, the processor 100 may request maintenance information for the particular service module from the cloud server and receive the maintenance information in response to the request.

As an example, the particular service module may be a service module capable of providing a particular beverage such as wine, etc. In this case, the processor 100 may receive various maintenance information such as a storage temperature of wine filled in the particular service module, etc. from the cloud server. In addition, a beverage filled in the particular service module may be maintained in an optimal storage condition for the beverage by maintaining and managing the particular service module according to the maintenance information.

In the description above, an example in which the processor 100 identifies a passenger corresponding to a service request received from the microphone 22 and detects a position of the identified passenger in a cabin is described. However, the identification of a passenger corresponding to the service request and the detection of a position of the identified passenger in a cabin may be performed by the cloud server or a control unit of the vehicle 20.

As an example, the cloud server or vehicle 20 may include voice information database in which a voice feature of each of a plurality of different people is stored and face information database in which a face feature of the plurality of different people is stored. In addition, when a request (a voice request) for a service is received from the microphone 22 of the vehicle 20, the control unit of the vehicle 20 may detect a voice feature from the received service request, and detect a person corresponding to the voice feature based on the voice information database. Alternatively, the cloud server may receive a service request (a voice request) detected from the microphone 22 of the vehicle 20 through the communication unit 130 of the vehicle 20, detect a voice feature from the received service request, and detect a person corresponding to the detected voice feature based on the voice information database included in the cloud server.

In addition, the cloud server or the control unit of the vehicle 20 may detect a face feature corresponding to the detected person from the face information database. Here, the face information database may be a database stored in a memory in the cloud server, or a memory in another server connected to the cloud server or the vehicle 20.

In addition, the cloud server or the control unit of the vehicle 20 may detect a passenger corresponding to the detected face feature from an image of passengers in a cabin. In addition, a seated position of the detected passenger may be detected from an image of inside of the cabin. Alternatively, when there is a seat designated for each passenger, the cloud server or the control unit of the vehicle 20 may detect a seat position of a passenger who requested the service, i.e., a service requester based on information of the designated seat for each passenger in the cabin.

Then, the processor 100 may be provided with the seated position or the seat position of the service requester from the cloud server or the control unit of the vehicle 20. In addition, the processor 100 may determine a service position in which the service is to be provided to the service requester, i.e., a movement position on the rail part 113 of a service module corresponding to the requested service based on the provided seated position or seat position. In this case, the service position may be one point on the rail part 113 adjacent to the seated position or the seat position of the service requester.

The above description is provided on an assumption that the microphone 22 and the camera 21 of the vehicle 20 are connected to the processor 100 through the interface unit 150. However, the present disclosure is not limited thereto. That is, the service providing apparatus 10 may include a separate microphone or a separate camera. In this case, according to a result detected by a microphone or a camera each included in the service providing apparatus 10, a request for a service may be identified, a requester of the service may be specified, and a position (a seated position or a seat position) of the specified service requester may be detected.

Figure 3:
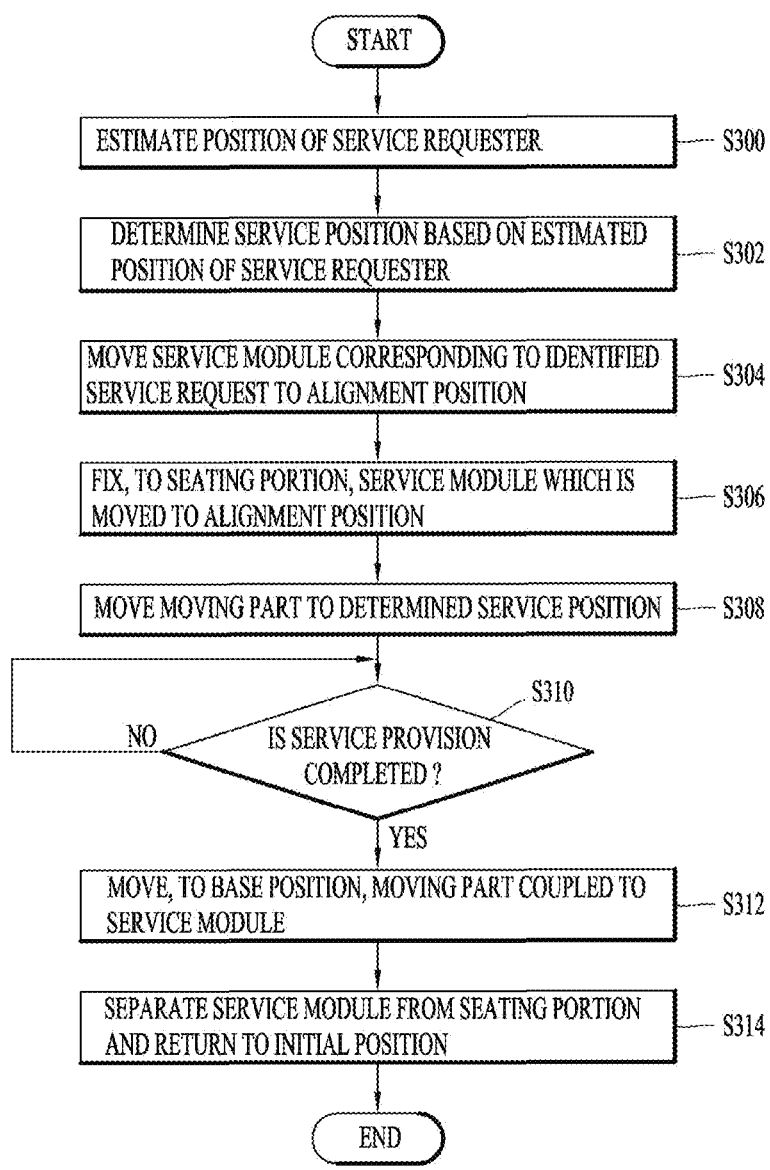
FIG. 3 is a flowchart illustrating an operation process of providing, by the service providing apparatus according to an embodiment of the present disclosure, a service requested by a service requester.

FIG. 3 is a flowchart illustrating an operation process of providing a service requested by a service requester, the providing being performed by the service providing apparatus 10 according to an embodiment of the present disclosure as described with reference to FIGS. 1 and 2.

First, the service providing apparatus 10 according to an embodiment of the present disclosure may identify a request for a service received from a microphone. When the service request is identified, an operation process for provide the service may be started. In this case, when the identified service request is a service that may currently be provided, the processor 100 may start the operation process for providing the service. That is, even when the service request is identified, the operation process for providing the requested service may be started when the identified service request is a service that may be provided through one of service modules provided in the service providing apparatus 10. That is, the operation process illustrated in FIG. 3 may be an operation that is started only when a request for a service that may be provided by the service providing apparatus 10 is received.

Accordingly, when a request for a service that may be provided by the service providing apparatus 10 is received and identified, the processor 100 may first estimate a position of the service requester who requested the service (S300). In this case, the processor 100 may identify the service requester based on a voice feature corresponding to the identified service request and estimate a position of the service requester based on a seat map or an image of inside of a cabin captured by a camera. As an example, the processor 100 may estimate a seat of the identified service requester in a pre-stored seat map as a position of the service requester, or estimate a position of a seat in which a passenger corresponding to a face feature of the service requester, identified from the image of the inside of the cabin captured by the camera, is seated as a position of the service requester.

Meanwhile, in operation S300, the processor 100 may transmit a service request detected by the microphone 22 or a result of voice identification of the service requester to the control unit of the vehicle 20 or the cloud server, and in response to this, receive the estimated position of the service requester. To do so, the processor 100 may further perform a process of transmitting the image of the inside of the cabin captured by the cameras to the cloud server, etc.

When the position of the service requester is estimated in operation S300, the processor 100 may determine a service position based on the estimated position of the service requester (S302). In this case, the service position may be one point on the rail part 113 adjacent to the estimated position of the service requester.

Then, the processor 100 may control the frame moving part 112 to move a service module corresponding to the identified service request to an alignment position (S304). Here, the alignment position is an initial position on the rail part 113, i.e., a position corresponding to the seating portion 111 located in the base position, and may be a position corresponding to mid-air at a certain height from the seating portion 111.

To do so, the processor 100 may move the frame moving part 112 so that one service module corresponding to the identified service request among service modules connected to the second frame 122 is located in mid-air above the seating portion 111, i.e., in the alignment position.

Figure 4:
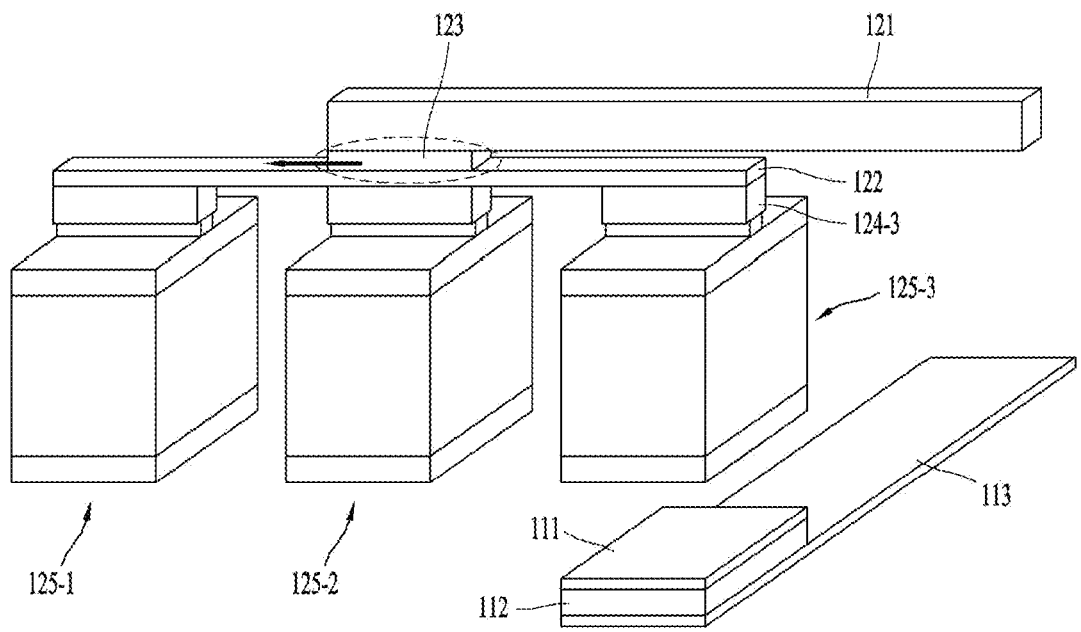
FIG. 4 illustrates an example of aligning a service module with a seating portion on a rail in the service providing apparatus according to an embodiment of the present disclosure.
Figure 4:
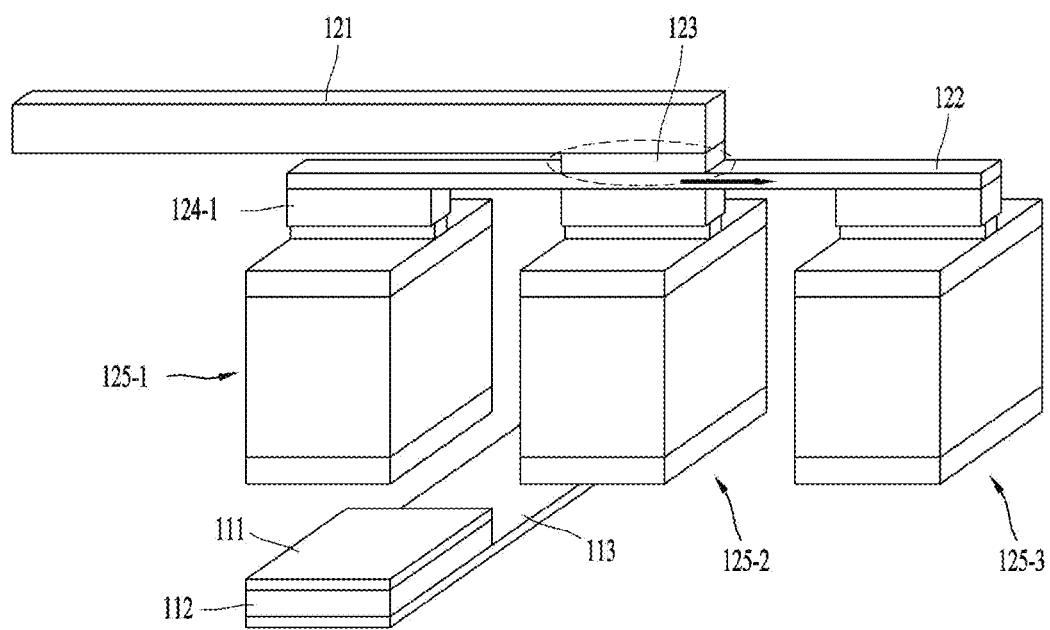

FIG. 4 illustrates an example of aligning a particular service module with a position corresponding to the seating portion 111 by moving the frame moving part 112 to move the particular service module to an alignment position, in the service providing apparatus 10 according to an embodiment of the present disclosure.

For example, when the service module corresponding to the identified service request is a third service module 125-3 connected to a left end of the second frame 122 as illustrated in (a) of FIG. 4, the processor 100 may move the frame moving part 112 toward a right side along the first frame 121 so that the third service module 125-3 is moved to a position corresponding to mid-air above the seating portion 111. Then, as illustrated in (a) of FIG. 4, the second frame 122 moves toward a right side along the frame moving part 112 moving toward a right side of the first frame 121. Thus, the third service module 125-3 connected to the left end of the second frame 122 may be moved to a position corresponding to the seating portion 111 placed below a central portion of the first frame 121. That is, the third service module 125-3 may be moved to the alignment position.

Unlike (a) of FIG. 4, (b) of FIG. 4 illustrates an example of a case in which a service module corresponding to the identified service request is a first service module 125-1 connected to a right end of the second frame 122. In this case, the processor 100 may move the frame moving part 112 toward a left side along the first frame 121 so that the first service module 125-1 is moved to a position corresponding to mid-air above the seating portion 111. Then, as illustrated in (b) of FIG. 4, the second frame 122 may move toward a left side along the frame moving part 112 moving toward a left side of the first frame 121. Thus, the first service module 125-1 connected to the right end of the second frame 122 may be moved to a position corresponding to the seating portion 111 placed below a central portion of the first frame 121. That is, the first service module 125-1 may be moved to the alignment position.

Unlike (a) and (b) of FIG. 4, the second service module 125-2 located at a center of the second frame 122 may be a service module corresponding to the identified service request. In this case, since the service module corresponding to the identified service request is already located in the alignment position, the processor 100 may not move the frame moving part 112.

Meanwhile, when the service module corresponding to the identified service request is moved to the alignment position, the processor 100 may control a tensile portion and the seating portion 111 each corresponding to the service module moved to the alignment position to fix the service module moved to the alignment position to the seating portion 111 (S306). As an example, the processor 100 may control the tension portion 124 to stretch a tension head to which the service module is coupled in a direction in which the seating portion 111 is located. In addition, as the tension head is stretched, when the service module is lowered and seated on the seating portion 111, the seating portion 111 may be controlled to fix the service module. Then, when the fixing by the seating portion 111 is completed, the coupling of the tension head may be released to separate the stretched tension head from the service module. Through this series of process, one service module may be separated from the tension portion 124.

Hereinafter, the operation process in which the service module is separated from the second frame 122 and seated on the seating portion 111 in operation S306 is described below in detail with reference to FIGS. 5 and 6.

When the service module 125 is separated from the second frame 122, specifically, the tension portion 124 and fixed onto the seating portion 111, the processor 100 may control the moving part 112 coupled to the seating portion 111 so that the seating portion 111 to which the service module is fixed is moved (S308). The processor 100 may control the moving part 112 in operation S308 to move the moving part 112 to the service position determined in operation S302. Accordingly, the service module seated on the seating portion 111, i.e., the service module corresponding to the identified service request may be out of a base position to move to the service position.

Here, the base position corresponds to an area which includes an opposite end of the rail part 113 stretched into the cabin and in which selection of a service module and movement to the alignment position are performed. The base position may be an area in which the rail moving part 110 in a standby state is stored when the service module is not seated. For example, the base position may correspond to an area behind a rearmost seat of the vehicle 20, and may be an enclosed area not to be visible from outside, except for an opening surface through which the rail part 113, the rail moving part 110 that moves along the rail part 113, and a service module fixed onto the rail moving part 110 enter or exit.

When the service module is moved to the service position according to the movement of the moving part 112, the processor 100 may determine whether the requested service has been provided by the service module (S310). For example, the processor 100 may determine whether the beverage has been dispensed in correspondence with a capacity according to the service request, and when the beverage has been dispensed, it may be determined that provision of the requested service is completed. Alternatively, the processor 100 may request, from the service requester, a confirmation of whether the provision of the service has been completed, and may determine whether the provision of the service has been completed based on a response to the request for the confirmation. In this case, the response may be performed by a voice input or an input of a preset key.

As a result of the determination in operation S310, when it is determined that the provision of the service is completed, the processor 100 may move the moving part 112 coupled to the service module through the seating portion 111 to the base position, i.e., the initial position (S312). Then, the processor 100 may separate the service module from the seating portion 111 and control a tension portion 124 corresponding to the separated service module to connect the service module back to the second frame 122. Then, the second frame 122 may be restored to the initial position by controlling the frame moving part 112 (S314).

Hereinafter, an operation process of restoring the service module to the initial position in operation S314 upon completion of the provision of the service is described in detail with reference to FIG. 7.

Figure 5:
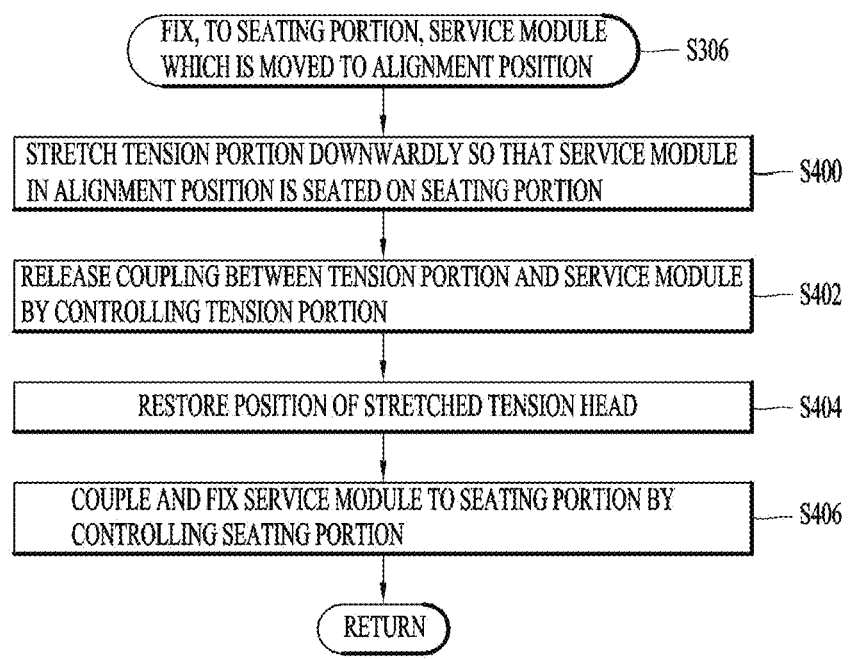
FIG. 5 is a flowchart illustrating an operation process of seating and fixing the service module according to the requested service onto a rail to move the service module, in the service providing apparatus according to an embodiment of the present disclosure.

FIG. 5 is a flowchart illustrating an operation process of seating and fixing a service module according to a requested service onto a rail to move the service module, in the service providing apparatus 10 according to an embodiment of the present disclosure, as described above. FIG. 6 illustrates an example of coupling and fixing, to the seating portion 111, the service module that has been moved to an alignment position in the service providing apparatus 10 according to an embodiment of the present disclosure.

Referring to FIG. 5, when the service module moves to the alignment position according to the movement of the frame moving part 112 in operation S304 of FIG. 3, a tensile portion corresponding to the service module that has moved to the alignment position may be controlled so that the service module which moved to the alignment position is lowered and seated on the seating portion 111 (S500).

In this case, each service module may be connected through a tension portion connecting each service module to the second frame 122. In this case, the tension portion may connect each of different service modules to the second frame 122. That is, respective service modules may be connected to a lower portion of the second frame 122 through tension portions corresponding to the service modules, respectively.

Figure 6:
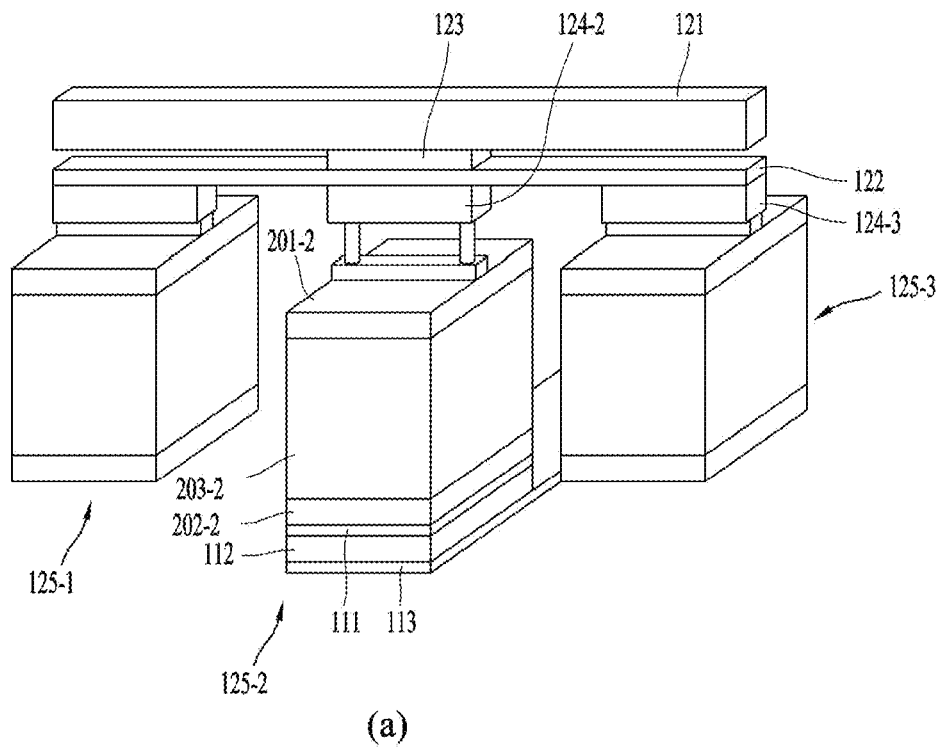
FIG. 6 illustrates an example of coupling and fixing the aligned service module to the seating portion in the service providing apparatus according to an embodiment of the present disclosure.
Figure 6:
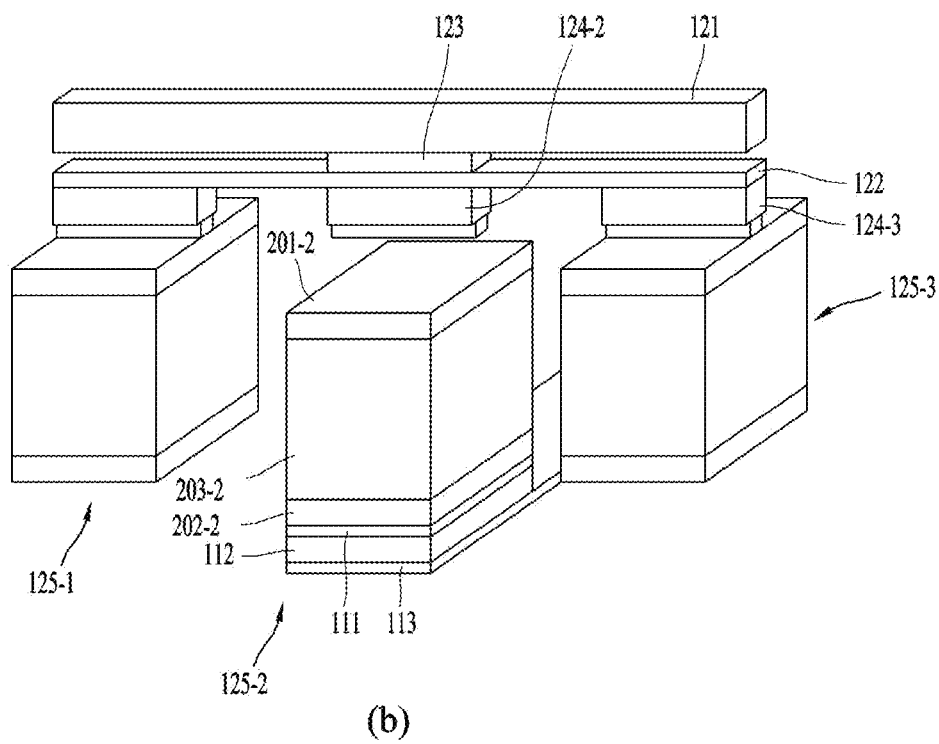

In this case, when a service module corresponding to the identified service request is the second service module 125-2, the second tension portion 124-2 corresponding to the second service module 125-2 may connect the second frame 122 to the second service module 125-2 as illustrated in (a) of FIG. 6. Then, when the second service module 125-2 is moved to mid-air above the seating portion 111, i.e., to the alignment position, a tension head of the second tension portion 124-2 connected to the service module 125-2 may be stretched in a downward direction according to operation S500 of FIG. 5, as shown in (a) of FIG. 6. In this case, the tension head of the second tension portion 124-2 may include an electromagnet, and the processor 100 may control the second tension portion 124-2 to supply power to the electromagnet included in the tension head of the second tension portion 124-2. Thus, the first coupling portion 201-2 disposed at an upper end of a main body 203-2 of the second service module 125-2 may be in a state of being adsorbed and coupled onto the tension head of the second tension portion 124-2. Accordingly, as illustrated in (a) of FIG. 6, when the tension head of the second tension portion 124-2 is stretched in a downward direction, the second service module 125-2 may be lowered to be seated on the seating portion 111.

Then, the processor 100 may control the tension portion corresponding to the service module according to the identified service request to release the coupling between the tension portion and the service module (S502). For example, when the second service module 125-2 is lowered to be seated on the seating portion 111 as illustrated in (a) of FIG. 6, the processor 100 may cut off the power supplied to the second tension portion 124-2. Then, magnetism in the tension head may be lost to release the coupling between the tension head from the first coupling portion 201-2 at an upper end of the second service module 125-2.

Then, the processor 100 may restore the stretched tension head (S504). Then, as illustrated in (b) of FIG. 6, the tension head of the second tension portion 124-2 may be contracted (S504).

When the second service module 125-2 is lowered to be seated on the seating portion 111 as illustrated in (a) of FIG. 6, the processor 100 may control the seating portion 111 to couple and fix the second tension portion 125-2 onto the seating portion 111 (S506). For example, the processor 100 may supply power to the electromagnet of the seating portion 111 so that the electromagnet of the seating portion 111 generates magnetism. Then, the second coupling portion 202-2 at the lower end of the second service module 125-2 may be adsorbed and fixed onto the seating portion 111 due to the magnetism generated by the electromagnet of the seating portion 111. In addition, the first coupling portion 201-2 at the upper end of the second service module 125-2 may be separated from the second tension portion 124-2, and spaced apart from the second tension portion 124-2 due to the contracted tension head. Accordingly, when the operation process of FIG. 5 is completed and operation S308 of FIG. 3 is performed, the moving part 112 coupled to the seating portion 111 is moved to the service position estimated in operation S302 of FIG. 3. Thus, the second service module 125-2 seated on the seating portion 111 may be moved to the service position.

Figure 7:
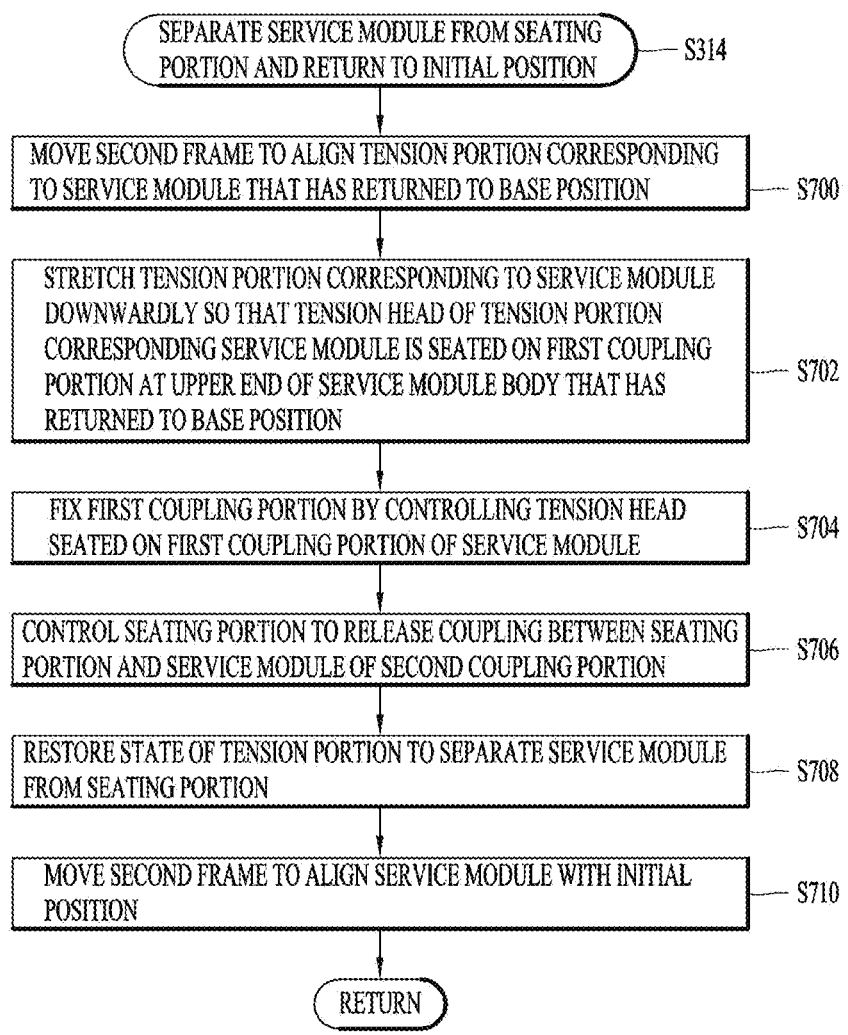
FIG. 7 is a flowchart illustrating an operation process of releasing a service module that has completed provision of a service from a seating portion and restoring the service module to an initial position, in the service providing apparatus according to an embodiment of the present disclosure.

FIG. 7 is a flowchart illustrating an operation process of releasing a service module that has completed provision of a service from a seating portion and restoring the service module to an initial position, in the service providing apparatus 10 according to an embodiment of the present disclosure.

Referring to FIG. 7, when the service provision is completed and the service module returns to a base position, the processor 100 may control the frame moving part 112 to move the second frame 122 so that a tension portion corresponding to the service module that has returned to the base position is moved to an alignment position (S700).

Then, a tension head of the tension portion corresponding to the service module that has returned to the base position may be stretched in a downward direction to be seated on a first coupling portion 201 at an upper end of the main body 203 of the service module that has returned (S702).

Then, when the tension head stretched in the downward direction is seated on the first coupling portion 201 of the service module that has returned, the processor 100 may control the tension head to couple the first coupling portion 201 to the tension head (S704). For example, the processor 100 may couple the first coupling portion 201 of the service module to the tension head by supplying power again to an electromagnet of the tension head to which power supply is cut off. Then, as the first coupling portion 201 is coupled to the tension head stretched in a downward direction, the service module that has returned may be fixed to the tension portion 124.

When the service module is coupled and fixed to the tension portion 124 through the tension head, the processor 100 may control the seating portion 111 so that a fixed state of the service module of the seating portion 111 on which the service module is currently seated is released (S706). For example, the processor 100 may release a fixed state of the seating portion 111 by cutting off power supplied to an electromagnet included in the seating portion 111. Then, as the fixed state of the service module in the seating portion 111 is released, the service module may be separated from the seating portion 111.

When the fixed state of the service module of the seating portion 111 is released through operation S706, the processor 100 may restore a state of the tension portion 124 so that the service module is separated from the seating portion 111 (S708). Then, as the tension head of the tension portion 124 is contracted, the service module coupled to the tension head may be raised. Therefore, as the service module is separated from the seating portion 111, the service module may be moved into mid-air above the seating portion 111, i.e., into mid-air corresponding to the seating portion 111.

Then, the processor 100 may move the second frame 122 to an initial position by controlling the frame moving part 112 (S710). For example, the initial position of the second frame 122 may be a position in which a center of the frame moving part 112 is located at a central portion of the first frame 121, or a position in which a center of the second frame 122 faces the central portion of the first frame 121.

As described above, when a service module is seated on a seating portion, coupling between a tension head of a tension portion and a service module may be released by cutting off power supply to an electromagnet included in the tension head, and simultaneously, the processor may fix the service module onto a seating portion by supplying power to the electromagnet included in the seating portion. In addition, when service provision is completed and a moving part on which the service module is seated moves to a base position, the processor may cut off power supply to an electromagnet of the seating portion and resume power supply to the tension head of the tensile portion corresponding to the service module seated on the seating portion to separate the service module from the seating portion, and simultaneously, control the seating portion and the tension head to couple the separated service module to the tension head.

Therefore, when the service module is not seated on the seating portion, the processor may supply power to the electromagnet of the tension head while maintaining a power cut-off state of the seating portion. Then, when the service module is seated on the seating portion, the processor switches the power supply to the electromagnet in the seating portion to cut off the power supply to the electromagnet of the tension head and supply power to the electromagnet of the seating portion. In addition, after service provision is completed, power is supplied to the electromagnet in the seating portion while the power supply to the electromagnet in the tension head is maintained in a cut-off state until the service module seated in the seating portion returns to the base position. Then, when the service module returns to the base position, the power supply is switched to the electromagnet in the tensile head to resume the power supply to the electromagnet of the tension head and cut off the power supply to the electromagnet of the seating portion.

That is, it may be understood that the processor may supply power to only one of the electromagnet of the tension head (hereinafter, a first electromagnet) and the electromagnet of the seating portion (hereinafter, a second electromagnet) according to an identified service request. It may be also understood that an electromagnet to which the power is supplied is changed under a preset condition, e.g., when the service module is seated on the seating portion, or when the service module that has moved along a rail part returns to the base position.

Figure 8:
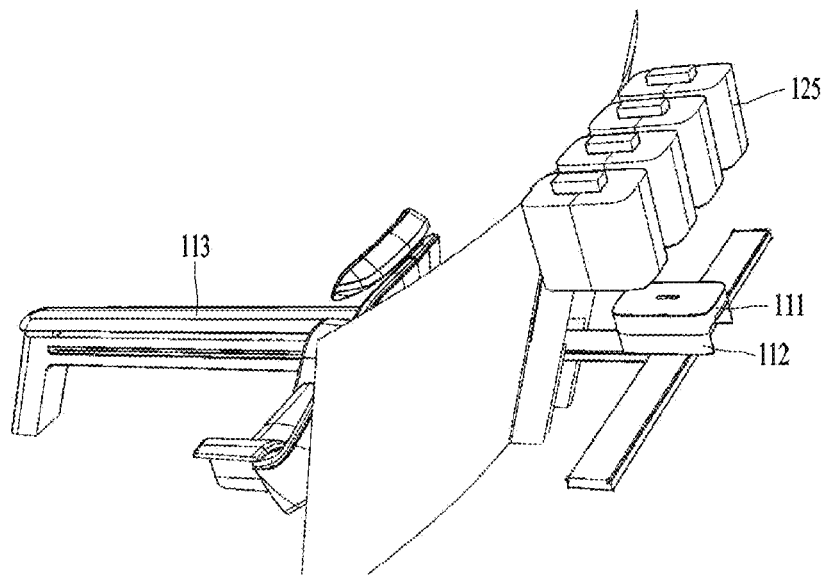
FIG. 8 illustrates an example of service modules disposed in the service providing apparatus according to an embodiment of the present disclosure included in a vehicle.
Figure 9:
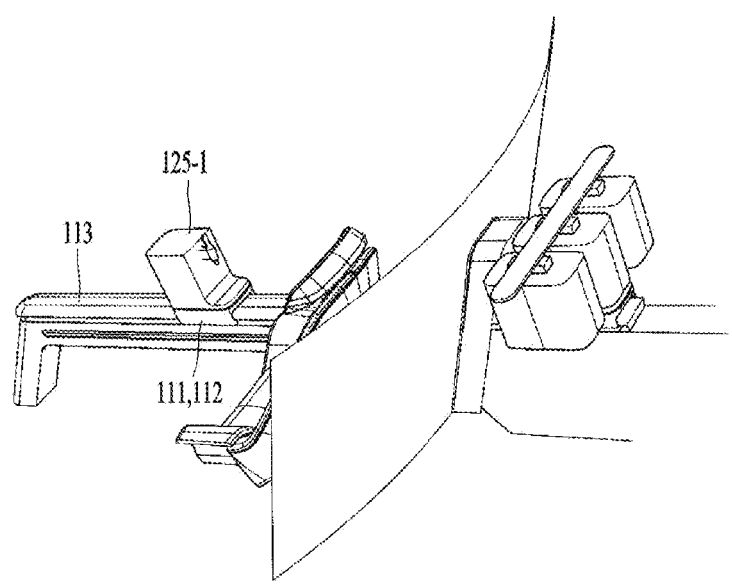
FIGS. 9 and 10 illustrate examples in which a purified water module configured to provide purified water has moved to a service position to provide a service in the service providing apparatus according to an embodiment of the present disclosure.

FIG. 8 illustrates an example of service modules disposed in the service providing apparatus 10 according to an embodiment of the present disclosure included in a vehicle. In addition, FIGS. 9 and 10 illustrate examples in which a purified water module configured to provide purified water has moved to a service position to provide a service, in the service providing apparatus 10 according to an embodiment of the present disclosure.

FIG. 8 illustrates an example of four service modules 125 disposed on a base in the service providing apparatus 10 according to an embodiment of the present disclosure. In this case, each service module may be disposed in a position apart from the seating portion 111, i.e., mid-air above the seating portion 111. Additionally, the base in which the service modules 125 are placed may be located in a space (a base space) hidden by a rear wall of a last seat in a cabin, as illustrated in FIG. 8.

Meanwhile, an opening area disposed such that the rail part 113 penetrates therethrough and is stretched into the cabin may be placed in the rear wall in the cabin, the rear wall separating the base space from the cabin. In addition, the opening area may be disposed to have a size to allow a service module seated on the seating portion 111 to pass the opening area. Therefore, as illustrated in FIG. 9, the first service module 125-1, i.e., a water purification module fixed onto the seating portion 111 may be moved to an area inside the cabin through the opening area in the rear wall along the rail part 113.

Figure 10:
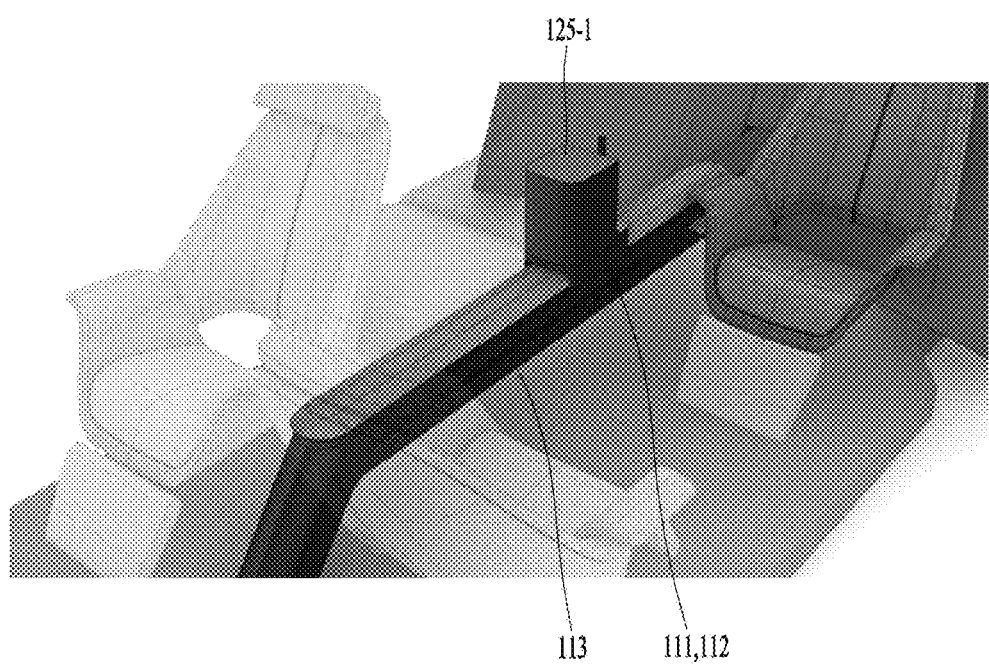

As illustrated in FIG. 10, the service module moving through the opening area in the rear wall may move a direction in which the rail part 113 is stretched as the moving part 112 moves. In addition, a service position adjacent to a seat position or a seated position of a service requester is reached, an alarm notifying arrival of the service module may be output. In addition, a service requested according to a request by the service requester may be provided.

As an example, the service module may notify the arrival of the service module through voice guidance or electronic sound. In addition, when the service requester manipulates a dispense lever or an approach of a container is detected, designated volume or requested volume of a beverage may be dispensed from a dispense portion. Then, the beverage is dispensed into the container and the service requested by the service requester may be provided.

When the service has been provided, the processor 100 may request the service requester to confirm whether the provision of the service is completed through voice guidance, etc. When the service requester confirms the completion of the service provision, the moving part 112 may be moved to the base position provided in the base space. Then, the provision of the service may be completed by separating the service module seated on the seating portion 111 and restoring the separated service module to an initial position.

Meanwhile, the seating portion 111 may be configured to be rotatable by a certain angle on the moving part 112. In this case, when the seating portion 111 is rotated, a direction toward which the dispense portion of the service module fixed onto the seating portion 111 is oriented may be rotated by a certain angle. As such, when the seating portion 111 is configured to be rotatable, the processor 100 may rotate the seating portion 111 by a predetermined angle so that the dispense portion is directed toward the service requester at the determined service position. In this case, the service requester may conveniently receive a service of the beverage dispensed from the dispense portion.

Figure 11:
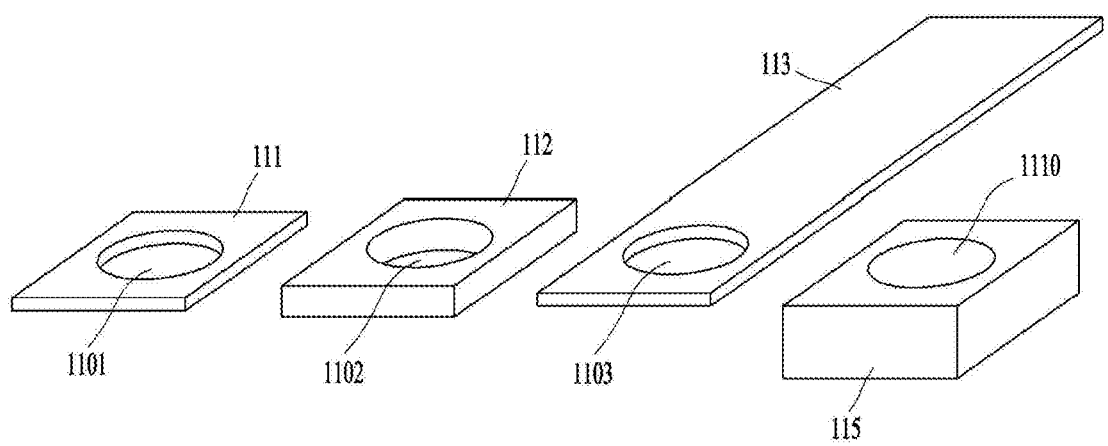
FIG. 11 illustrates an example of a maintenance module disposed in a preset position of a base in the service providing apparatus according to an embodiment of the present disclosure.
Figure 11:
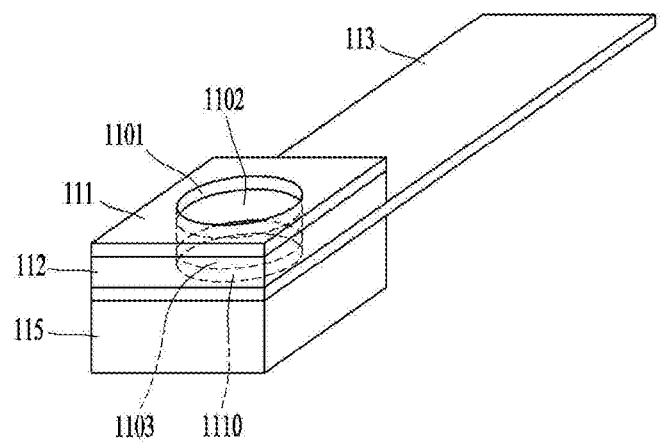
Figure 12:
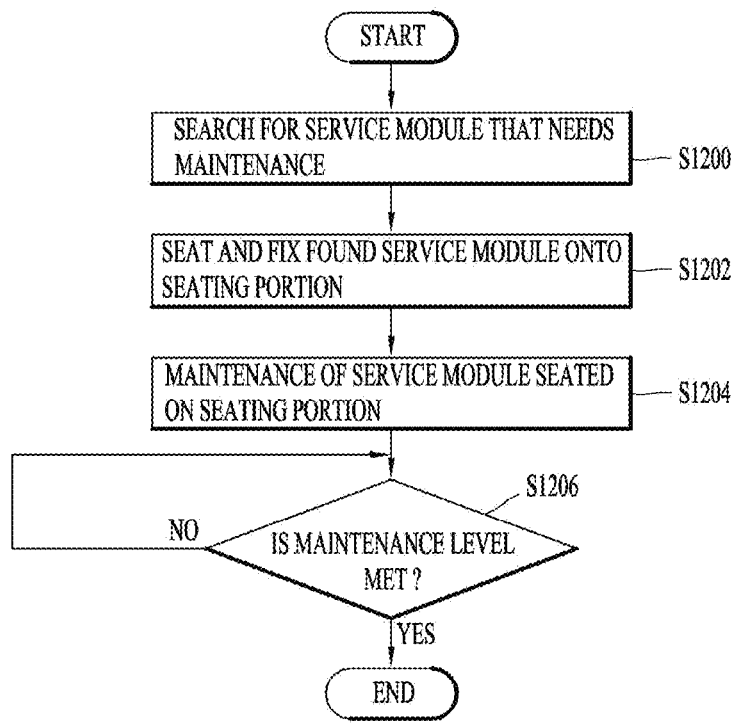
FIG. 12 illustrates an example of an operation process of searching for a service module that needs maintenance and performing maintenance on a found service module in the service providing apparatus according to an embodiment of the present disclosure.

Meanwhile, the service providing apparatus 10 according to an embodiment of the present disclosure may include a maintenance module configured to maintain heat or coldness in a plurality of service modules included in the service providing apparatus 10. FIG. 11 illustrates an example of the maintenance module disposed in a preset position of a base in the service providing apparatus 10 according to an embodiment of the present disclosure. FIG. 12 illustrates an example of an operation process of searching for a service module that needs maintenance and performing maintenance on a found service module in the service providing apparatus 10 according to an embodiment of the present disclosure.

Here, a maintenance module 115 may be a cooling module. For example, in a case of the cooling module, the cooling module may have a configuration such as an evaporator and a compressor, a condenser, a condenser fan, an evaporator, an evaporator fan, a capillary tube, etc. to discharge cold air through a discharge hole 1110. In this case, the maintenance module 115 may be coupled to the service module 125 through one area of the rail part 113, the moving part 112, and the seating portion 111, and cool a beverage filled in the service module 125 with cold air discharged through the discharge hole 1110. In this case, a beverage-filled container in the service module may be configured to be cooled according to the cold air discharged through the discharge hole 1110, and the service module may be designed to have a cold reserving effect to maintain a cooled state of the beverage-filled container for a long period of time.

In this case, as illustrated in (a) of FIG. 11, through holes 1101 and 1102 corresponding to the discharge hole 1110 may be disposed in the moving part 112 and the seating portion 111, respectively. In addition, a through hole 1103 corresponding to the discharge hole 1110 may be disposed also in the base position, that is, one position on the rail part 113 corresponding to positions of the moving part 112 and the seating portion 111 in a standby state in which a service is not requested. Then, as illustrated in (b) of FIG. 11, a cold air passage from the discharge hole 1110 in the maintenance module 115 to a service module seated on the seating portion 111 may be defined by the through holes 1101, 1102, and 1103. Accordingly, when cold air is discharged through the discharge hole 1110, the cold air discharged from the discharge hole 1110 through the through hole 1103 in the rail part 113, the through hole 1102 in the moving part 112, and the through hole 1101 in the seating portion 111 may be directly supplied to a lower end of a service module 125 seated on the seating portion 111.

Meanwhile, referring to FIG. 12, according to an operation process of performing maintenance of service modules through the maintenance module in the service module 125 according to an embodiment of the present disclosure, the processor 100 may detect a service module that needs maintenance by checking a maintenance state of respective service modules (S1200).

For example, as a result of checking a temperature in a service module configured to provide a beverage such as cola, etc. which needs to be cooled, when the temperature is equal to or higher than a certain level, the processor 100 may determine that cooling (maintenance) of the service module is needed.

As such, whether maintenance of a service module is needed may be determined depending on a service provided by each service module. For example, when the service is a service for providing a beverage, whether maintenance is needed may be determined depending on a type of a beverage that may be provided through each service module.

Meanwhile, whether maintenance of each service module is needed may be provided through a cloud server. That is, when the service providing apparatus 10 according to an embodiment of the present disclosure includes a particular service module configured to provide a particular beverage, the processor 100 may request information for maintenance of the particular service module from the cloud server. Then, the cloud server may provide the information for maintenance of the particular service module to the processor 100. Then, the processor 100 may determine whether maintenance of the particular service module is needed according to the provided maintenance information.

The maintenance information may include a proper cooling temperature for a beverage filled in the particular service module. For example, when the particular service module is a service module configured to provide a best-tasting wine at a particular temperature, the cloud server may provide information about the particular temperature to the processor 100. Then, the processor 100 may perform maintenance of the particular service module to maintain a temperature of a beverage filled in the particular service module at the particular temperature.

Meanwhile, it has been described above that maintenance of a service module is performed by the processor 100. However, unlike this, maintenance of each service module may be also performed by the cloud server. In this case, the processor 100 may transmit service module state information such as a temperature or a humidity detected in each service module to the cloud server, and the cloud server may transmit control information for controlling the processor 100 in response to the transmitted service module state information. Then, the processor 100 may perform maintenance on each service module according to the received control information.

However, hereinafter, for convenience of description, a description will be provided on an assumption that the processor 100 performs maintenance on respective service modules according to maintenance information about the respective service modules provided by the cloud server.

As such, when the maintenance information for the respective service modules is provided from the cloud server, the processor 100 may search for a module that needs maintenance among the respective service modules based on the provided maintenance information. Then, when a service module that needs maintenance is found, the found service module may be seated on the seating portion 111, and the seating portion 111 may be controlled to couple and fix the found service module onto the seating portion 111 (S1202).

Then, the maintenance module 115, for example, a cooling module may be driven. Then, the service module is coupled and fixed onto the seating portion 111 so that cold air discharged from the maintenance module 115 may be directly provided to the service module through the through holes 1101, 1102, and 1103. Accordingly, the service module seated on the seating portion 111 may be cooled. That is, maintenance may be performed on the service module seated on the seating portion 111 (S1204).

Meanwhile, when the maintenance is performed on the service module seated on the seating portion 111, the processor 100 may determine whether a maintenance level for the seated service module has been met based on the maintenance information provided from the cloud server. When the maintenance level is met, that is, when the temperature of the beverage in the service module is cooled to a proper temperature, the processor 100 may determine that sufficient maintenance has been performed and finish a maintenance operation process for the seated service module. Then, the processor 100 may control the seating portion 111 and the tension portion 124 to separate the service module from the seating portion 111 and finish driving of the maintenance module 115.

Then, the processor 100 may proceed back to operation S1200 and search for another service module that needs maintenance. When another service module that needs maintenance is present, the operation process of FIG. 12 may be performed again. Then, a service module seated on the seating portion 111 may be changed. That is, the processor 100 included in the service providing apparatus 10 according to an embodiment of the present disclosure may perform maintenance on a plurality of different service modules through one maintenance module 115. That is, the maintenance module 115 may be a commonly used maintenance module capable of performing maintenance of a plurality of different service modules.

Meanwhile, the above description is provided on an assumption that the through holes 1101, 1102, and 1103 are disposed in the seating portion 111, the moving part 112, and the rail part 113, respectively. However, a medium to which cold air is transmitted, instead of the through holes may be configured as a conductor. For example, when a medium such as copper, etc., which has high heat transfer efficiency, is configured as a conductor, each conductor may be cooled by cold air from the discharge hole 1110, thereby cooling a service module seated on the seating portion 111.

Additionally, in the above description, it is assumed that the maintenance module 115 is a cooling module. However, unlike this, the maintenance module 115 may be a heating module. In this case, the maintenance module 115 may have a configuration in which hot air instead of cold air may be discharged through the discharge hole 1110. In addition, when the maintenance module 115 is a heating module, a beverage in a service module seated on the seating portion 111 may be heated, and the service module may be designed to have a heat insulation effect to maintain a temperature of the heated beverage for a long period of time.

Meanwhile, a case in which one through hole or conductor is disposed on a rail moving part has been described above. However, the present disclosure is not limited thereto. That is, a plurality of through holes or conductors configured to transmit cold air or hot air discharged from the maintenance module 115 to the service module may be disposed on the rail moving part.

Meanwhile, only an example in which one rail moving part 110 is included, and each time the rail moving part 110 reciprocates, one service is provided through one service module seated on the one rail moving part 110 is described above. However, the present disclosure is not limited thereto. That is, when a plurality of rail moving parts 110 are included, a plurality of different services requested by a plurality of service requesters may be provided simultaneously using the plurality of rail moving parts 110.

Figure 13:
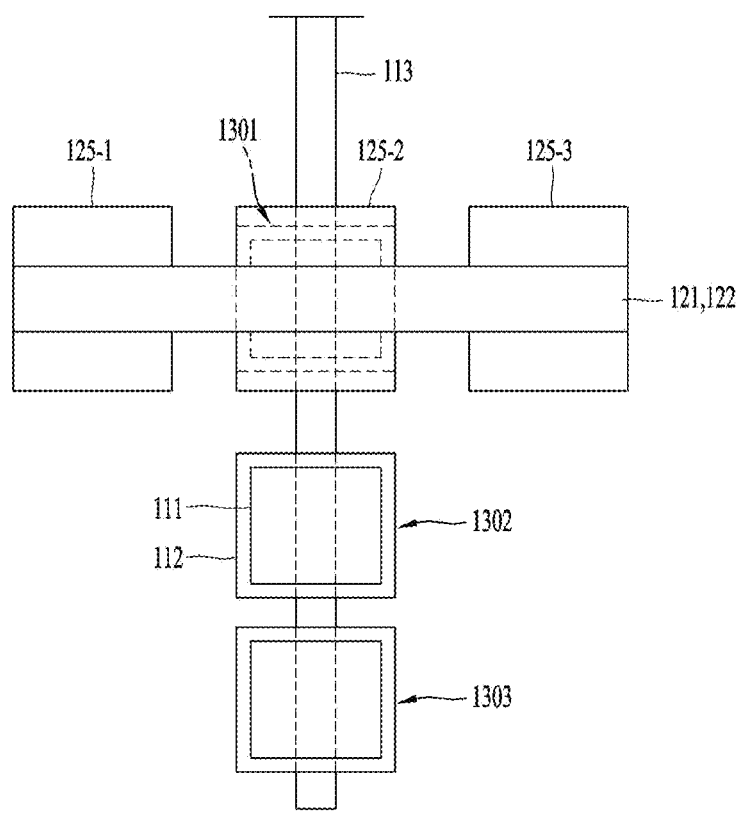
FIG. 13 illustrates an example of a service providing apparatus according to another embodiment of the present disclosure, the service providing apparatus including a plurality of rail moving parts.
Figure 14:
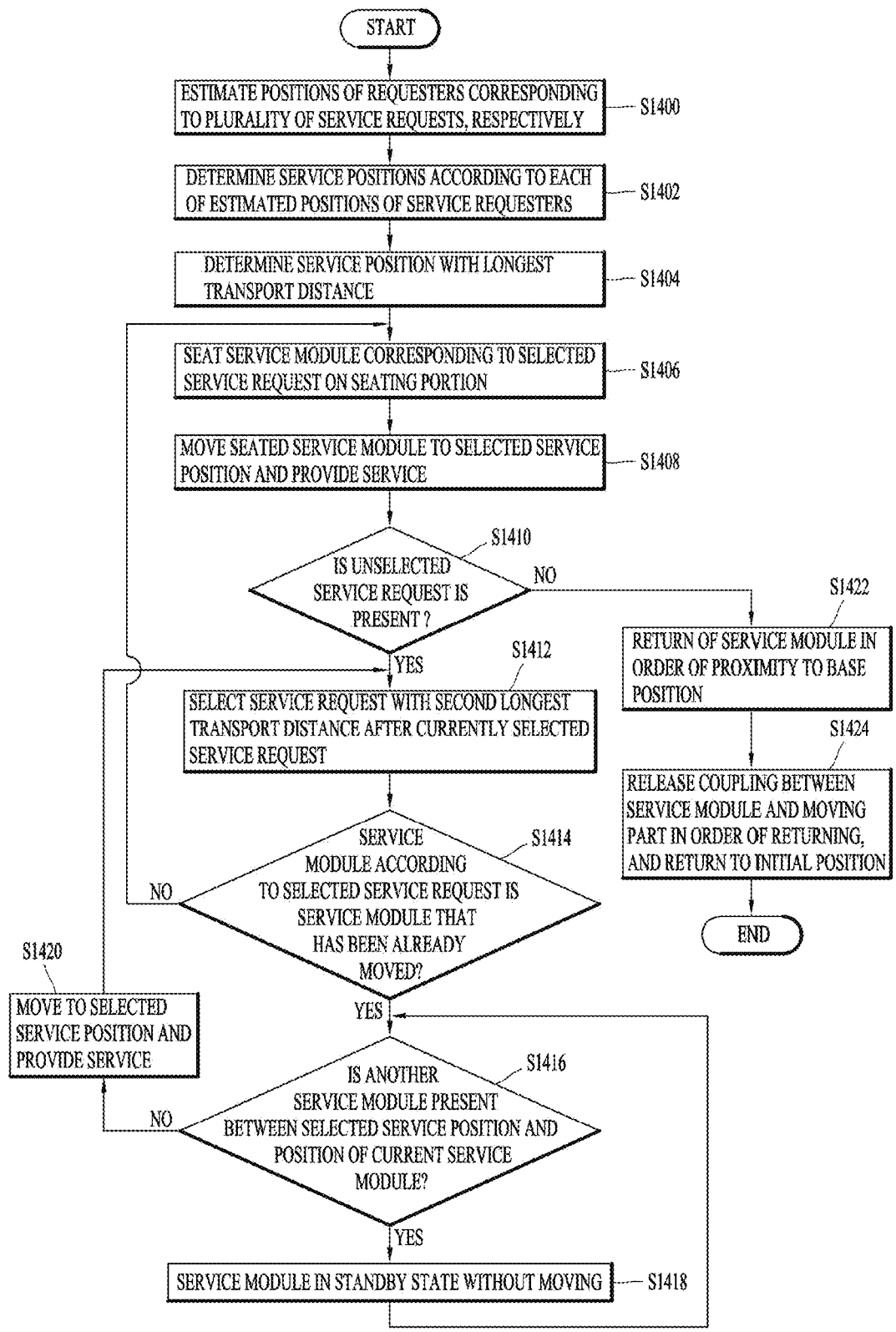
FIG. 14 is a flowchart illustrating an operation process of simultaneously providing a plurality of different services to a plurality of requesters in the service providing apparatus of FIG. 13.

FIG. 13 illustrates an example in which the service providing apparatus 10 according to an embodiment of the present disclosure includes a plurality of rail moving parts 110, that is, a plurality of moving parts and a plurality of seating portions coupled to each of the moving parts. In addition, FIG. 14 is a flowchart illustrating an operation process of simultaneously providing a plurality of different services to a plurality of requesters in the service providing apparatus 10 of FIG. 13.

First, FIG. 13 is a plan view of the service providing apparatus 10 including the plurality of rail moving parts 110. Referring to FIG. 13, the second frame 122 may be connected to the first frame 121 through the frame moving part 112. FIG. 13 shows an example in which the first frame 121 overlaps the second frame 122. In addition, an example in which the second frame 122 is connected to three service modules, such as the first service module 125-1, the second service module 125-2, and the third service module 125-3 is shown. That is, a structure of service modules and frames may be identical to that described above with reference to FIG. 2.

However, unlike the configuration of the service providing apparatus 10 of FIG. 2, the service providing apparatus 10 of FIG. 13 may include first to third rail moving parts 1301, 1302, and 1303. In this case, the first to third rail moving parts 1301, 1302, and 1303 may be sequentially disposed along the rail part 113 in a direction opposite to a direction in which the rail part 113 is stretched into a cabin. Hereinafter, a direction toward inside of the cabin is described as a front direction, and a direction opposite to the direction toward the inside of the cabin is described as a rear direction.

As shown in FIG. 13, in a case in which the first to third rail moving parts 1301, 1302, and 1303 are included, each rail moving part may move to a base position when another rail moving part located in the front direction moves into the cabin along the rail part 113. Here, the base position is a point at which the first and second frames 121 and 122 intersect the rail part 113 so that a service module may be seated. The base position may be a position on an upper surface (the seating portion 111) of a rail moving part, wherein the service module may be seated thereon when the service module is lowered. FIG. 13 may show a state in which the first rail moving part 1301 is located in the base position.

Therefore, in a state in which one of the service modules is seated on the first rail moving part 1301 and moved into the cabin along the rail part 113 to provide a first service that has been identified, when a request for a second service other than a request for the first service is identified, the processor 100 may control the second rail moving part 1302 disposed behind the first rail moving part 1301 to move to the base position. Here, the first service request and the second service request may be requests for services provided by different service modules.

Then, while a service according to one service module (the first service module) is provided through the first rail moving part 1301, another service module (the second service module) may be seated and fixed onto the second rail moving part 1302. Accordingly, while the service according to the first service module is provided to a requester of the first service through the first rail moving part 1301, the second rail moving part 1302 may move into the cabin along the rail part 113. Accordingly, a service according to the second service module may be provided to a requester of the second service through the second rail moving part 1302.

Meanwhile, while the services according to the first and second service modules are provided, when a request for a service (a request for a third service) other than the services provided by the first and second service modules is received, the processor 100 may control the third rail moving part 1303 disposed behind the second rail moving part 1302 to move to the base position. Then, another service module (the third service module) may be seated and fixed onto the third rail moving part 1302. Accordingly, while the services according to the first and second service modules are provided to the requesters of the first and second services through the first and second rail moving part 1301 and 1302, the third rail moving part 1303 may move into the cabin along the rail part 113. Accordingly, the service according to the third service module may be provided to a requester of the third service through the third rail moving unit 1303.

FIG. 14 is a flowchart illustrating an operation process in which the service providing apparatus 10 has the structure of FIG. 13 and provides a plurality of services.

Referring to FIG. 14, when a plurality of service requests for requesting services to be provided by different service modules are identified, the processor 100 of the service providing apparatus 10 may estimate positions of service requesters corresponding to the plurality of identified service requests, respectively (S1400). In this case, the positions of the respective service requester may be estimated based on an identification result according to voice features of the respective service requesters, and face features or a preset seat arrangements, etc. Additionally, similarly to the description above, the positions of the respective service requesters may be estimated by the cloud server or the control unit of the vehicle 20.

When the positions of the respective service requesters are estimated in operation S1400, the processor 100 may determine service positions corresponding to the respective service requests based on the estimated positions of the respective service requesters (S1402). In this case, the respective service positions may be positions which are disposed on the rail part 113 and adjacent to the estimated positions of the respective service requesters and do not overlap each other.

Then, the processor 100 may determine and select a position of a service with a longest transport distance among the determined service positions (S1404). Here, the transport distance is a distance on the rail part 113 ranging from the base position to a service position, and a service position located on the rail part 113 to be farthest from the base position may be the service position with the longest transport distance.

When the service position with the longest transport distance is selected in operation S1404, the processor 100 may seat and fix a service module according to a service request corresponding to the selected service position onto the first rail moving part 1301 (S1406). Then, the service may be provided by moving the first rail moving part 1301 onto which the service module is seated and fixed to the service position selected currently, that is, the service position with the longest transport distance (S1408).

Then, the processor 100 may detect whether other service requests that are not selected are present (S1410). Then, as a result of the detecting in operation S1410, when other service requests are not present, the service module that has been moved currently may be allowed to return (S1422). Then, the service module that has returned may be uncoupled from the first rail moving part 110 to restore a position of the service module (1424).

Meanwhile, as a result of the detecting in operation S1410, other service requests that are not currently selected may be present. As an example, a request for a purified water service may be received, and before a service according to the purified water service request is completed, a request for a wine service and a request for a coffee service may be sequentially received.

In addition, when a transport distance with respect to a service requester who requested the purified water service is longer than transport distances with respect to service requesters who requested the wine and coffee services, the processor 100 may select the request for the purified water service first among the service requests described above, in operation S1404. Then, a service module according to the selected request, that is, a module for the purified water service may be fixed onto the first rail moving part 1301 and moved (operation S1408). In this case, only the purified water service request may be selected, and the wine service request and the coffee service request may not be selected. Then, the processor 100 may detect that service requests (e.g., the wine service request and the coffee service request) that are not currently selected are present in operation S1410.

Then, the processor 100 may select a service request with a second longest transport distance after the currently selected service request (e.g., the purified water service request) (S1412). That is, when at least one another service request is further received while a service module is performing a service according to an identified service request, the processor 100 may determine an order of services to be provided according to a length of a transport distance determined based on a service position according to a position of a service requester, rather than according to an order of service requests. By doing so, a plurality of rail moving parts may share one rail part 113, and any one service module may provide another service according to at least one other service request received while a service is being performed. Accordingly, while a service according to one service request is provided, at least one other service may be also provided. That is, services according to a plurality of service requests simultaneously received may be provided.

Accordingly, when there are service unselected requests among currently received service requests (operation S1410), the processor 100 may select a service request with a longest transport distance among the unselected service requests (operation S1412).

Then, the processor 100 may determine whether a service module according to the selected service request is a service module that has already been moved to provide a service (S1414). That is, for example, in a state in which a purified water service module for a purified water service is moved according to a request for the water purification service, the processor 100 may determine whether a service module according to a service request selected thereafter according to a transport distance is the purified water service module again.

Then, when a result of the determination indicates that the service request corresponding to the service module that has been moved to provide a service is selected again, the processor 100 may detect whether another service module is present between a service position according to the service request selected currently and a service module (e.g., the purified water service module) according to the service request selected currently (S1416). In addition, when the another service module is detected, the service module (e.g., the purified water service module) according to the service request selected currently may be in a standby state without being moved for a certain period of time (S1416). Then, when the certain period of time elapses, operation S1416 may be performed again to detect again whether another service module is present between a service position according to the currently selected service request and a service module (e.g., the purified water service module) according to the currently selected service request.

As a result of the detecting in operation S1416, when another service module is not present between the service position according to the currently selected service request and the service module (e.g., the purified water service module) according to the currently selected service request, the processor 100 may check whether provision of a service by a currently selected service module is completed. When the provision of the service is completed, a service position may be updated to a currently selected service position, that is, the service position according to the service request selected according to the transport distance in operation S1412. Then, the currently selected service module and a rail moving part on which the currently selected service module is seated may be controlled so that the selected service module moves to the updated service position and provides a service.

Then, the processor 100 may proceed back to operation S1412 to select a service request with a longest transport distance among service requests that have not been selected up to present. That is, according to the example described with reference to operation S1412, when a transport distance according to the wine service request among the wine service request and the coffee service request is longer than the transport distance according to the coffee service request, the processor 100 may select the wine service request.

In this case, the service module according to the currently selected service request (e.g., the wine service module) may be different from the service module that has already been moved to provide a service (e.g., the purified water service module). Accordingly, the processor 100 may proceed to operation S1406 according to a result of the determining in operation S1414 to seat and fix a service module (the wine service module) corresponding to the currently selected service module onto another rail moving part, for example, the second rail moving part 1302. Then, operation S1408 may be performed to provide a service by moving the rail moving part on which the service module is seated to the service position according to the currently selected service request. In this case, the currently selected service request may be a service request with a shorter transport distance than a transport distance according to a previously selected service request. Therefore, after the service module according to the previously selected service request moves along the rail part 113, even when the service module according to the currently selected service request moves along the rail part 113, a collision between the service modules may not occur.

Then, the processor 100 may perform a subsequent process. That is, operation S1410 may be performed to detect whether unselected service requests are further present, and when the unselected service requests are further present, one of the unselected service requests may be selected based on a transport distance according to the unselected service requests. Then, when the selected service request is associated with a service module that has already been moved for the current service request, a service position of the service module that has been already moved may be updated and movement of the service module that has been already moved may be controlled to move to the updated service position. However, when the currently selected service request is not associated with the service module that has already been moved, the service module according to the currently selected service request may be fixed onto another rail moving part, and the service module fixed onto the another rail moving part may be controlled to move to a service position according to the currently selected service request. Accordingly, a plurality of rail moving parts may move on one rail part 113 and provide services according to a plurality of service requests received simultaneously.

Meanwhile, when unselected service requests are not present in operation S1410, the processor 100 may proceed to operation S1422 to allow service modules that have completed service provision to return in an order of proximity to the base position, that is, an order of short transport distances. Then, operation S1424 may be performed to control the rail moving part 110 and tension portions corresponding to respective service modules to separate the service modules from the rail moving part in an order in which the service modules return. Additionally, when all service modules return, the processor 100 may control the frame moving part 112 so that the second frame 122 connected to the respective service modules is restored to an initial position.

Meanwhile, an example in which the service providing apparatus 10 fixes a service module onto the rail moving part 110 and move the service module to a service position according to a service request has been described above.

However, the rail part 113 may be used not only to move the service module but also to move various other devices including input/output devices such as a keyboard or a touch pad.

Thus, the moving part 112 of the service providing apparatus 10 according to an embodiment of the present disclosure may be implemented to have a gantry form so that movement of the service module is not restricted by movement of the other devices on the rail part 113. In addition, the other devices may be freely moved through a space between an upper inner end of the moving part having the gantry form and the rail part 113.

Figure 15A:
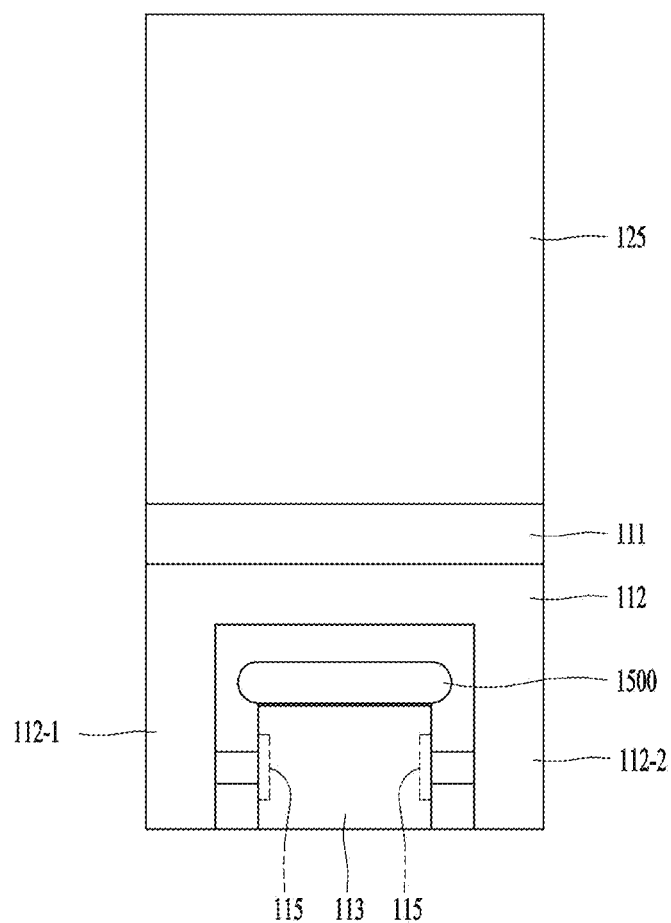
FIGS. 15A and 15B illustrate an example in which a moving part in the service providing apparatus according to an embodiment of the present disclosure is configured to have a gantry form, and an example in which another device moves along a rail through the moving part configured to have the gantry form.
Figure 15B:
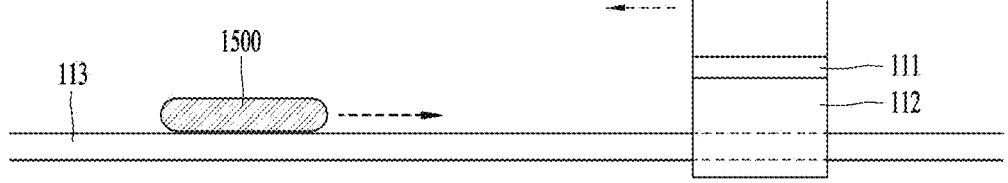
Figure 15B:
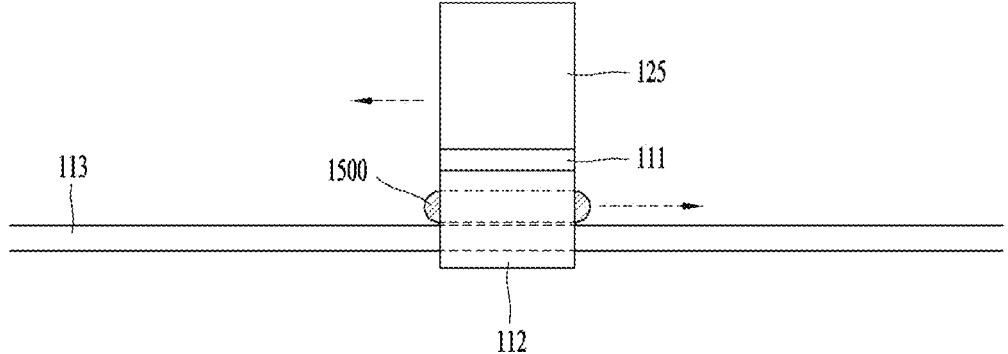
Figure 15B:
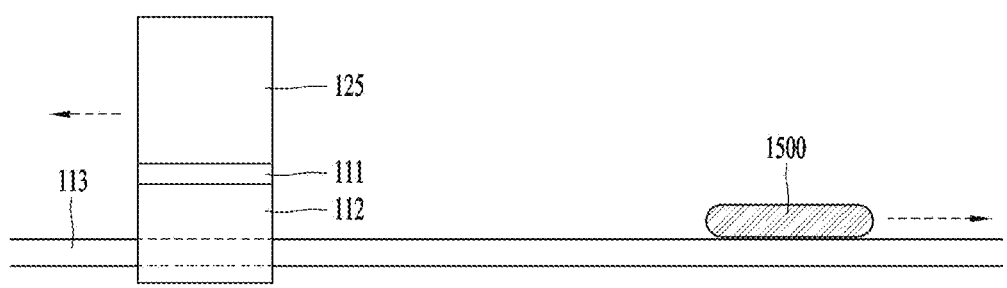

FIGS. 15A and 15B illustrate an example in which the moving part 112 in the service providing apparatus 10 is configured to have a gantry form and an example in which another device moves along a rail through the moving part configured to have the gantry form, according to an embodiment of the present disclosure.

FIG. 15A shows an example of the moving part 112 configured to have a gantry form, the seating portion 111 disposed on an upper end of the moving part 112, and the service module 125 fixed onto the seating portion 111.

When the moving part 112 is configured to have a gantry structure as shown in FIG. 15A, inner sides of a left support part 112-1 and a right support part 112-2 of the moving part 112 having the gantry structure and the rail part 113 may be implemented as at least one moving mechanism for moving a body of the moving part 112 configured to have the gantry structure.

As an example, the inner sides of the left support part 112-1 and the right support part 112-2 of the moving part 112 may include a wheel, a gear, etc. which protrudes toward the rail part 113. In addition, at least one drive motor configured to provide driving force for driving the protruding wheel or gear may be included. In addition, a rail 115 that may be coupled to a wheel or a gear protruding from the inner sides of the left support part 112-1 and the right support part 112-2 of the moving part 112 may be disposed on both sides of the rail part 113. Accordingly, the wheel or the gear protruding from the inner sides of the left and right support parts 112-1 and 112-2 of the moving part 112 may be coupled to a rail on both sides of the rail part 113, and the body of the moving part 112 may be moved along the rail part 113 by driving force transmitted to the wheel or the gear.

Meanwhile, the upper inner end of the moving part 112 having the gantry structure may be located at a certain height from an upper surface of the rail part 113. Accordingly, as shown in FIG. 15A, a space having a certain size may be defined between the upper inner end of the moving part 112 having the gantry structure and the upper surface of the rail part 113. In addition, another device capable of moving along the rail part 113 may be configured to be movable through the space defined between the upper inner end of the moving part 112 and the upper surface of the rail part 113.

As an example, the other device may be an input device such as a keyboard or a touch pad. In this case, the other device may include at least one moving mechanism that allows a body of the other device to be movable along the upper surface of the rail part 113. For example, the rail part 113 may be configured to have a form of a conveyor belt and include a rotating part (not shown) configured to provide driving force to rotate the conveyor belt. Then, the other device may have a form attachable to an upper surface of the rail part 113 to be movable together with movement of the conveyor belt disposed on the upper surface of the rail part 113.

In this case, when a service request for the other device is received, the processor 100 may detect a position of a requester of the service and determine a position of the service according to the detected position of the service requester. In addition, the conveyor belt may be rotated by controlling the rail part 113 so that a point on the conveyor belt onto which the other device is attached or disposed reaches the service position. In addition, as the one point on the conveyor belt onto which the other device is attached or disposed reaches the service position, a service using the other device may be provided to the service requester who requested the other device.

As described above, when the moving part 112 is configured to have a gantry structure, a space between an upper inner surface of the moving part 112 having the gantry structure and the upper surface of the rail part 113 may be a space sufficient for the other device 1500 to pass therethrough as shown in FIG. 15A. Therefore, as shown in (a) and (b) of FIG. 15B, even when a moving direction of the other device 1500 is opposite to a moving direction of a service module, i.e., the moving part 112, the devices 1500 may pass through the moving part 112 through the space between the upper inner surface of the moving part 112 of the gantry structure and the upper surface of the rail part 113.

Accordingly, provision of a service with respect to the other devices 1500 may be performed regardless of movement of the moving part 112. That is, the processor 100 may simultaneously provide a service request with respect to the other device 1500 and a service request with respect to a service module, respectively. In this case, the processor 100 may determine service positions corresponding to both of the service requests described above, respectively, not to overlap each other to allow to provide both services according to the service requests.

Meanwhile, the other device 1500 may be a device having a modifiable shape. As an example, when a service is provided to a user, at least a part of the other device 1500 may be erected at a preset angle or greater from the rail part 113 to provide high readability to the user. In this case, when the service is being provided, at least a part of the other device 1500 may be maintained to have a form (a first form) erected at a preset angle or greater. Then, when the moving part 112 that has moved or is currently moving approaches the other device 1500 by a preset distance or closer, a whole of the other device 1500 may be changed to a lying form (a second form) parallel to the rail part 113. That is, the other device 1500 may be a device having a modifiable shape so that the other device 1500 may pass through a space between the upper inner surface of the moving part 112 and the upper surface of the rail part 113.

It has been described above that the service providing apparatus according to an embodiment of the present disclosure provides a service by moving a service module along a rail part. However, the present disclosure may also be applied to a display disposed corresponding to each seat in a cabin. As such, an apparatus according to the present disclosure applied to a display is to be referred to as a service providing apparatus according to another embodiment of the present disclosure.

Figure 16:
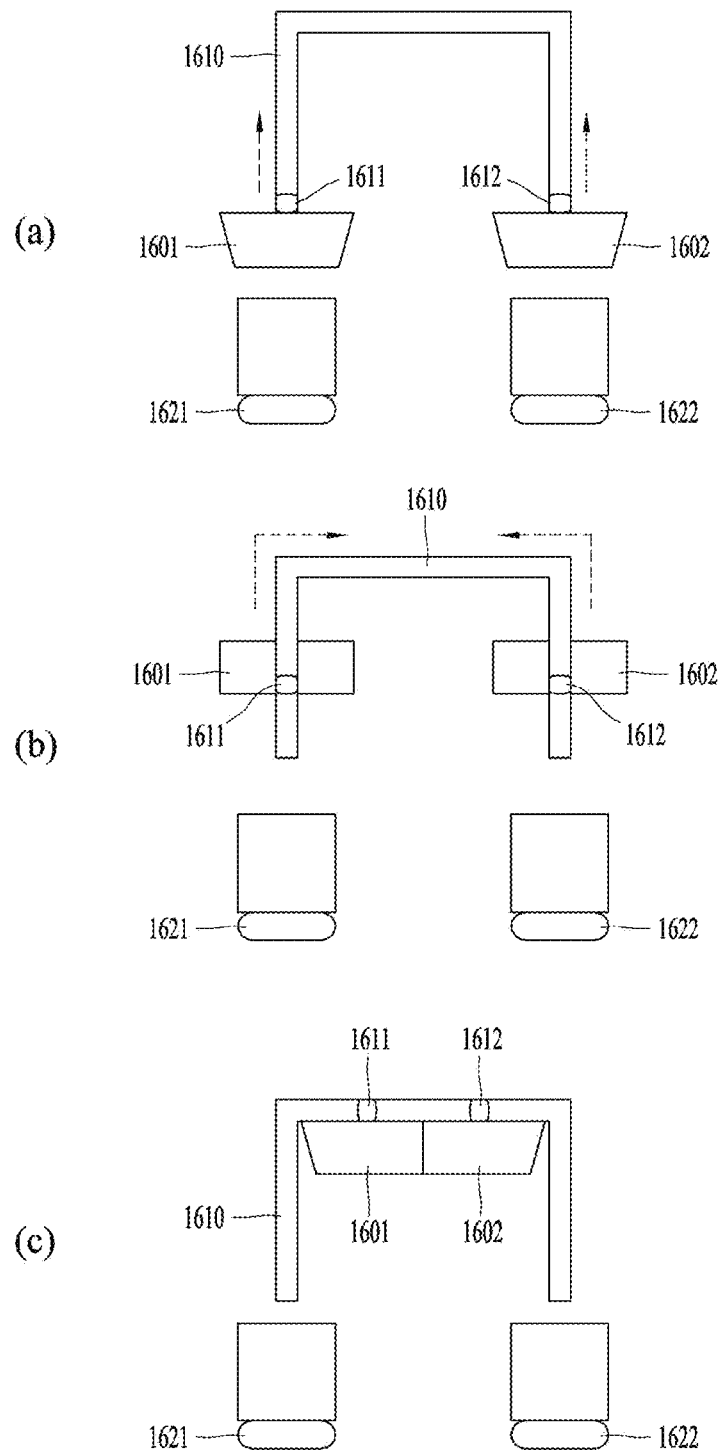
FIG. 16 illustrate an example of providing, the service providing apparatus according to an embodiment of the present disclosure, a service related to position movement of a display unit.

FIG. 16 illustrate an example of providing, the service providing apparatus according to another embodiment of the present disclosure, a service related to position movement of a display unit.

(a) of FIG. 16 illustrates an example of seats 1621 and 1622 in a cabin and first and second displays 1601 and 1602 disposed on a ceiling of the vehicle 20 in correspondence with each seat. The first and second displays 1601 and 1602 may be disposed on a rail part 1610, and the rail part 1610 and each of the displays 1601 and 1602 may be connected and fixed to the rail part 1610 through hanging parts 1611 and 1612, respectively. Here, the hanging parts 1611 and 1612 may be configured to be movable along the rail part 1610. That is, the hanging parts 1611 and 1612 may include a moving part such as a wheel or a gear coupled to a rail of the rail part 1610, and at least one drive motor configured to drive the moving part to provide driving force for moving bodies of the displays.

In this case, the processor of the service providing apparatus according to another embodiment of the present disclosure may control each of the hanging parts 1611 and 1612 to allow the displays 1601 and 1602 to respectively move along the rail part 113 depending on whether a preset condition is fulfilled. Here, the fulfillment of the preset condition may be determined depending on whether there are passengers seated in the seats 1621 and 1622 corresponding to the displays 1601 and 1602, respectively, whether the passengers use a display (whether or not content is viewed-which may be determined using an image obtained by sensing via a camera), or whether at least one request by the passengers seated in first and second seat, i.e. the seats 1621 and 1622 is present.

For example, when there is at least one request from the passengers seated in the first and second seats 1621 and 1622, or when the passengers seated in the first and second seats 1621 and 1622 are not using the display, the processor may determine that the preset condition is fulfilled. Therefore, as shown in (b) of FIG. 16, the hanging parts 1611 and 1612 may be controlled to move the displays 1601 and 1602 to designated positions on the rail part 1610, respectively. In this case, the designated positions may be positions in which a side surface of one display may be in contact with a side surface of another display.

Therefore, as shown in (c) of FIG. 16, the processor may move the first hanging part 1611 to one position on the rail part 1610, for example, a position adjacent to a center. Then, the second hanging part 1612 may be moved to a position adjacent to the first hanging part 1611. In this case, an adjacent position between the hanging parts described above may be a position apart in correspondence with a distance such that the side surfaces of the displays moved by each hanging part may be in contact with each other.

Accordingly, when the first display 1601 is moved according to the movement of the first hanging part 1611 and the second hanging part 1612 is moved to the position adjacent to the first hanging part 1611, a left side surface of the second display 1602 moved by the second hanging part 1612 may be brought into contact with a right side surface of the first display 1601. Accordingly, the first and second displays 1601 and 1602 may constitute a large-sized screen display by being connected to each other in a horizontal direction. Then, the processor may output content suitable for the large-sized screen display to the first and second displays 1601 and 1602 connected to each other. That is, another service providing apparatus according to an embodiment of the present disclosure may implement a large-sized screen display by moving unused displays along a rail part to be connected to each other and provide a service using the large-sized screen display.

The present disclosure can be implemented as computer-readable codes in a program-recorded medium. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). Additionally, the computer may include the processor 100 of the in-vehicle service providing apparatus 10. Therefore, the detailed description should not be limitedly construed in all of the aspects, and should be understood to be illustrative. The scope of the present disclosure should be determined by reasonable interpretation of the appended claims, and all changes within the equivalent scope of the present disclosure are embraced by the appended claims.

The invention claimed is:

1. An in-vehicle service providing apparatus comprising:
a module unit comprising a plurality of service modules configured to provide services different from each other;
a rail part comprising a rail stretched into a cabin of a vehicle;
a moving part onto which one of the plurality of service modules is seated and fixed, and which is configured to move along the rail; and
a processor configured to: identify a request for a service that may be provided through one of the plurality of service modules, detect a first service module corresponding to the identified service request, determine a service providing position based on a position of a service requester who made the identified service request in the cabin, control the module unit to seat the first service module onto the moving part, and control the moving part onto which the first service module is seated to move to the determined service providing position.

2. The in-vehicle service providing apparatus of claim 1, wherein the module unit comprises:
a first frame stretched in a direction intersecting the rail and located at a certain height from the rail;
a second frame disposed below the first frame, stretched in a direction parallel to a direction of the first frame, and connected to different service modules at a constant interval along the direction of being stretched; and
a frame moving part connected to the second frame and configured to move the connected second frame along the first frame,
wherein the processor moves the second frame by controlling the frame moving part to align the first service module with a base position in which the first frame intersects the rail.

3. The in-vehicle service providing apparatus of claim 2, wherein the second frame and each of the plurality of service modules are connected through tension portions corresponding to the plurality of service modules, respectively,
the tension portions are configured to be stretchable in a downward direction, and comprise a tension head coupled to a service module corresponding to the tension head and configured to fix the coupled service module, and
when the first service module is aligned with the base position according to the movement of the second frame, the processor controls a tension portion corresponding to the first service module to stretch the tension head to seat the first service module on the moving part disposed in the base position.

4. The in-vehicle service providing apparatus of claim 3, wherein the service module comprises:
a service module body;
a first coupling portion disposed at an upper end of the service module body, and configured to be coupled and fixed to the tension head; and
a second coupling portion disposed at a lower end of the service module body, and configured to be coupled and fixed to the moving part.

5. The in-vehicle service providing apparatus of claim 4, wherein the tension head and at least one part of an upper end of the moving part comprise an electromagnet configured to generate magnetic force when power is supplied, and
the first coupling portion and the second coupling portion of the service module are made of a metallic material adsorbed onto the electromagnet due to attractive force generated by magnetic force when the magnetic force is generated from the electromagnet.

6. The in-vehicle service providing apparatus of claim 5, wherein the processor supplies power to one of a first electromagnet disposed in the tension head of the tension portion corresponding to the first service module and a second electromagnet disposed at the upper end of the moving part, and
changes an electromagnet to which the power is supplied based on whether the first service module is seated on the moving part, and whether the service module seated on the moving part has returned to the base position.

7. The in-vehicle service providing apparatus of claim 1, wherein the processor extracts a voice feature from the identified service request, identifies the service requester from the extracted voice feature, estimates a seat position or a seated position of the identified service requester from a pre-stored seat map or a cabin image obtained by sensing passengers in the cabin, and determines one position located on the rail to be adjacent to the estimated seat position or seated position as the service providing position.

8. The in-vehicle service providing apparatus of claim 7, wherein the processor detects face feature information corresponding to the identified service requester from pre-stored face feature information of different people and detects a passenger corresponding to the detected face feature information from the cabin image to estimate the seated position of the service requester.

9. The in-vehicle service providing apparatus of claim 7, further comprising an interface unit configured to receive the cabin image obtained from at least one camera disposed in the vehicle,
wherein the processor obtains the cabin image by controlling the interface unit.

10. The in-vehicle service providing apparatus of claim 7, further comprising an interface unit connected to a control unit of the vehicle or a communication unit configured to perform a communication connection to a preset external server,
wherein the processor transmits voice information corresponding to the identified service request to the control unit of the vehicle or the external server, and, in response to the transmitting, receives information about an estimated seat position or seated position of the identified service requester.

11. The in-vehicle service providing apparatus of claim 10, wherein the vehicle or the external server is configured to: comprise a voice information database in which voice feature information for each of a plurality of people related to the vehicle is stored, and a face information database in which face feature information for each of the plurality of people related to the vehicle, and
identify, when the voice information corresponding to the identified service request is received from the processor, a service requester corresponding to a voice feature of the voice information based on the voice information database, detect face feature information corresponding to the identified service requester based on the face information database, detect a seated position of a particular passenger corresponding to the detected face feature information among passengers in the cabin comprised in the cabin image obtained by sensing the passengers in the cabin, and transmit information about the detected seated position of the particular passenger, in response to the voice information.

12. The in-vehicle service providing apparatus of claim 2, further comprising a maintenance module configured to provide cold air or hot air to a lower portion of the base position,
wherein the processor detects a service module that needs heating or cooling among the plurality of service modules and heats or cools the detected service module by moving the detected service module to the base position.

13. The in-vehicle service providing apparatus of claim 12, wherein the processor places the moving part in the base position, controls the module unit to seat the service module that needs heating or cooling on the moving part located in the base position, and drives the maintenance module when the service module is seated on the moving part to transfer cold air or hot air discharged from the maintenance module to the seated service module via the moving part.

14. The in-vehicle service providing apparatus of claim 13, wherein the moving part comprises at least one conductor or through hole configured to transfer the cold air or the hot air discharged from the maintenance module to the service module seated on the moving part.

15. The in-vehicle service providing apparatus of claim 12, wherein the plurality of service modules are modules filled with beverages different from each other to serve beverages different from each other, and
the in-vehicle service providing apparatus further comprises a communication unit configured to perform a communication connection with at least one external server configured to provide maintenance information in correspondence with the different beverages filled in the plurality of service modules, respectively.

16. The in-vehicle service providing apparatus of claim 15, wherein the processor moves the plurality of service modules sequentially to the base position to heat or cool the plurality of service modules according to the maintenance information in correspondence with the different beverages, the maintenance information being provided from the at least one external server.

17. The in-vehicle service providing apparatus of claim 1, wherein the moving part comprises a plurality of rail moving parts disposed to be movable along the rail and configured such that the one of the plurality of service modules is seated thereon, and
in a state when the first service module is seated on the first rail moving part and moved along the rail to provide a service according to an identified first service request, when a second service request corresponding to a second service module is identified, the processor controls the module unit so that the second service module is seated on a second rail moving part and controls the second rail moving part to be moved to a service position of a service requester corresponding to the second service request.

18. The in-vehicle service providing apparatus of claim 17, wherein, in a state when the first service module is seated on the first rail moving part and moved along the rail to provide the service according to the identified first service request, when the second service request corresponding to the second service module and a third service request corresponding to a third service module are identified, the processor controls the module unit and the moving part so that service modules corresponding to respective service requests are seated on different rail moving parts and move along the rail sequentially, according to a result of comparing a transport distance according to a position of the service requester corresponding to the second service request to a transport distance according to a position of a service requester corresponding to the third service request.

19. The in-vehicle service providing apparatus of claim 1, wherein the moving part is configured to have a gantry structure comprising left and right support portions connected to both left and right sides of the rail part, respectively.

20. The in-vehicle service providing apparatus of claim 19, wherein the rail part comprises a conveyor belt configured to move along the rail, and
a space having a certain size is defined between an upper surface of the rail part configured as the conveyor belt and an upper inner end of the moving part having the gantry structure connecting between the left side support portion and the right side support portion.

* * * * *